United States Patent
Suzuki et al.

(10) Patent No.: US 9,831,731 B2
(45) Date of Patent: Nov. 28, 2017

(54) STATOR AND ROTARY ELECTRIC MACHINE HAVING PHASE WINDINGS WOUND IN MULTIPLE DOUBLE SLOTS

(71) Applicant: DENSO CORPORATION, Kariya, Aichi-pref. (JP)

(72) Inventors: Hideaki Suzuki, Toyoake (JP); Masahiro Seguchi, Obu (JP); Yuki Takahashi, Obu (JP); Shinsuke Sugiura, Nishio (JP)

(73) Assignee: DENSO CORPORATION, Kariya (JP)

( * ) Notice: Subject to any disclaimer, the term of this patent is extended or adjusted under 35 U.S.C. 154(b) by 307 days.

(21) Appl. No.: 14/073,042

(22) Filed: Nov. 6, 2013

(65) Prior Publication Data

US 2014/0125187 A1    May 8, 2014

(30) Foreign Application Priority Data

Nov. 7, 2012  (JP) .................................. 2012-245299

(51) Int. Cl.
   *H02K 3/28*    (2006.01)
   *H02K 3/12*    (2006.01)

(52) U.S. Cl.
   CPC ................. *H02K 3/28* (2013.01); *H02K 3/12* (2013.01); *H02K 2213/03* (2013.01)

(58) Field of Classification Search
   CPC .. H02K 3/28; H02K 3/50; H02K 3/12; H02K 2213/03; G09B 5/062

(Continued)

(56) References Cited

U.S. PATENT DOCUMENTS 6,949,848 B2 *  9/2005  Yamada .................. H02K 3/522
                                                       29/596
6,969,938 B2 * 11/2005  Seguchi ................... H02K 3/28
                                                       310/180

(Continued)

FOREIGN PATENT DOCUMENTS

JP       50-132419       10/1975
JP      2010-166803       7/2010

(Continued)

OTHER PUBLICATIONS

Office Action (3 pgs.) dated Sep. 16, 2014 issued in corresponding Japanese Application No. 2012-245299 with an at least partial English-language translation thereof (3 pgs.).

*Primary Examiner* — Bernard Rojas
*Assistant Examiner* — Rashad Johnson
(74) *Attorney, Agent, or Firm* — Nixon & Vanderhye P.C.

(57) ABSTRACT

In a stator having a stator core and phase windings, slots are formed in the stator core and each slot accommodates conductors in a layer structure from one end to the other end of the slot in a radial direction of the stator core. The phase windings in one phase have conductors accommodated in a first slot and a second slot which are adjacently formed in the stator core. An electrical connection between the conductors in a n-th layer and the conductors in a (n+1)-th layer includes that the conductors accommodated in the first slot are electrically connected together, the conductors accommodated in the second slot are electrically connected together, and the conductors accommodated in the first slot are electrically connected with the conductors accommodated in the second slot. This connection eliminates a phase difference in the first slot and the second slot in a distributed winding structure.

20 Claims, 21 Drawing Sheets

(58) Field of Classification Search
USPC ........ 310/140, 141, 142, 146, 179–210, 216
See application file for complete search history.

(56) References Cited

U.S. PATENT DOCUMENTS

| | | | | |
|---|---|---|---|---|
| 7,034,428 | B2* | 4/2006 | Cai | H02K 3/12 310/184 |
| 7,242,124 | B2* | 7/2007 | Ogawa | H02K 3/12 310/179 |
| 2010/0096943 | A1* | 4/2010 | Yamaguchi | H02K 21/16 310/195 |
| 2010/0148620 | A1 | 6/2010 | Ishizuka et al. | |
| 2011/0006709 | A1* | 1/2011 | Naiman | H02P 27/04 318/400.3 |
| 2011/0175483 | A1* | 7/2011 | Koike | H02K 3/12 310/201 |
| 2011/0181146 | A1* | 7/2011 | Asano | H02K 3/12 310/208 |
| 2011/0210638 | A1* | 9/2011 | Ogawa | H02K 3/12 310/195 |
| 2012/0007462 | A1* | 1/2012 | Kouda | H02K 3/12 310/206 |
| 2012/0146447 | A1* | 6/2012 | Seguchi | H02K 3/12 310/198 |
| 2012/0161569 | A1* | 6/2012 | Hisada | H02K 15/0081 310/201 |
| 2013/0187509 | A1* | 7/2013 | Nakamura | H02K 3/28 310/184 |
| 2014/0062230 | A1* | 3/2014 | Mori | H02K 3/12 310/58 |
| 2014/0125185 | A1* | 5/2014 | Suzuki | H02K 3/28 310/198 |
| 2014/0125186 | A1 | 5/2014 | Takahashi et al. | |
| 2014/0125187 | A1* | 5/2014 | Suzuki | H02K 3/12 310/202 |
| 2015/0022047 | A1* | 1/2015 | Shibata | H02K 3/28 310/208 |
| 2015/0054374 | A1* | 2/2015 | Neet | H02K 3/12 310/198 |
| 2015/0229174 | A1* | 8/2015 | Tokizawa | H02K 3/12 310/208 |

FOREIGN PATENT DOCUMENTS

| | | |
|---|---|---|
| JP | 2012-130093 | 7/2012 |
| JP | 2014-096858 | 5/2014 |

* cited by examiner

STATOR AND ROTARY ELECTRIC MACHINE HAVING PHASE WINDINGS WOUND IN MULTIPLE DOUBLE SLOTS

CROSS-REFERENCE TO RELATED APPLICATION

This application is related to and claims priority from Japanese Patent Application No. 2012-245299 filed on Nov. 7, 2012, the contents of which are hereby incorporated by reference.

BACKGROUND OF THE INVENTION

1. Field of the Invention

The present invention relates to stators and rotary electric machines comprised of a stator which is composed of a stator core and a plurality of phase windings.

2. Description of the Related Art

There is a conventional technique which discloses a stator of a rotary electric machine having a simple structure capable of decreasing eddy current loss generated by leakage flux without increasing a manufacturing cost. For example, Japanese patent laid open publication No. JP 2012-130093 has disclosed a conventional technique regarding a rotary electric machine having the above function. In the structure of the conventional rotary electric machine disclosed in JP 2012-130093, the stator is comprised of segment conductors and a plurality of divided phase windings. The segment conductors are divided into N segment groups. Phase windings are composed of divided N segment groups connected in parallel. The divided N segment groups are arranged in parallel.

The patent document JP 2012-130093 shows the technique in which two phase windings are arranged in parallel. However, the patent document JP 2012-130093 does not show a measure of suppressing a generation of a circulating current when the number of the phase windings arranged in parallel is more than two. In other words, it cannot always prevent a circulating current from being generated when the technique disclosed in the patent document JP 2012-130093 is applied to a rotary electric machine having a stator comprised of a plurality of phase windings of more than two, i.e. multiple phase windings arranged in parallel.

SUMMARY

It is therefore desired to provide a stator and a rotary electric machine equipped with the stator capable of suppressing generation of a circulating current when phase windings are wound in parallel in multiple double slots, i.e. several pairs of slots in a distributed winding structure.

An exemplary embodiment provides a stator having an improved structure. The stator is comprised of a stator core and a plurality of phase windings. The stator core is comprised of a plurality of slots formed and arranged in the stator core in a circumferential direction of the stator core. Each of the phase windings is comprised of conductors. The conductors are electrically connected together to form the phase windings. The conductors are accommodated in the corresponding slots so that the conductors are stacked in a plurality of layers in each of the slots from one side to the other side in a radial direction of the stator core. Each of the phase windings is comprises the conductors connected together and accommodated in a first slot and a second slot. The first slot and the second slot are adjacent to each other. That is, each of the phase windings is wound around the stator by electrically connecting the conductors which are accommodated in a (2n−1)-th layer in the first slot to the conductors accommodated in a 2n-th layer in the second slot. The electrical connection between the conductors in the n-th layer and the conductors in the (n+1)-th layer is such that (a) the conductors accommodated in the first slot are electrically connected together, (b) the conductors accommodated in the second slot are electrically connected together, and (c) the conductors accommodated in the first slot are electrically connected with the conductors accommodated in the second slot.

In the structure of the stator previously described, the phase winding is wound around the stator by electrically connecting the conductors accommodated in the first slot and the second slot. In addition to the structure in which the conductors accommodated in the same slot are electrically connected, the conductors, which are accommodated in different slots such as the first slot and the second slot, are electrically connected. This connection structure of the conductors can suppress a circulating current from flowing in the phase windings arranged in parallel in the first slot and the second slot in a distributed winding (which correspond to double slots contained in several pairs of slots). This makes it possible to prevent loss caused by a circulating current.

In accordance with another aspect of an exemplary embodiment, there is provided a stator in which each of the phase windings has a terminal. The terminals are electrically connected to form a connection selected from a star connection, a delta connection and a star-delta connection. This structure makes it possible to suppress generation of a circulating current and avoids any loss caused by the generation of a circulating current even if the phase windings are formed in a connection selected from the star connection, the delta connection and the star-delta connection.

In accordance with another aspect of an exemplary embodiment, there is provided a rotary electric machine comprised of the stator having the structure previously described and a rotor arranged to face the stator. This makes it possible to suppress an electric potential difference between phases and to easily select a phase connection selected from a star connection, a delta connection and a star-delta connection.

It is possible to electrically connect a plurality of conductors having a predetermined shape (for example, a character "U" shape) together, and also acceptable to use a single wiring having the same length as the conductors would be when connected together.

A layer connecting conductor (which will be explained in a first exemplary embodiment) has a crank shape and connects the conductor in a 2n-th layer to a conductor in a (2n+1)-th layer. It is possible for the layer connecting conductors to be made of any material and have any shape so long as it can connect the conductors, i.e. the phase windings together. It is possible to apply the concept of the stator according to the present invention to a rotary electric machine so long as it has a rotary section (for example, a rotary axis, a rotary shaft, etc.). In other words, it is possible to apply the concept of the stator to various types of electric machine such as an alternator, an electric motor, and a motor generator.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
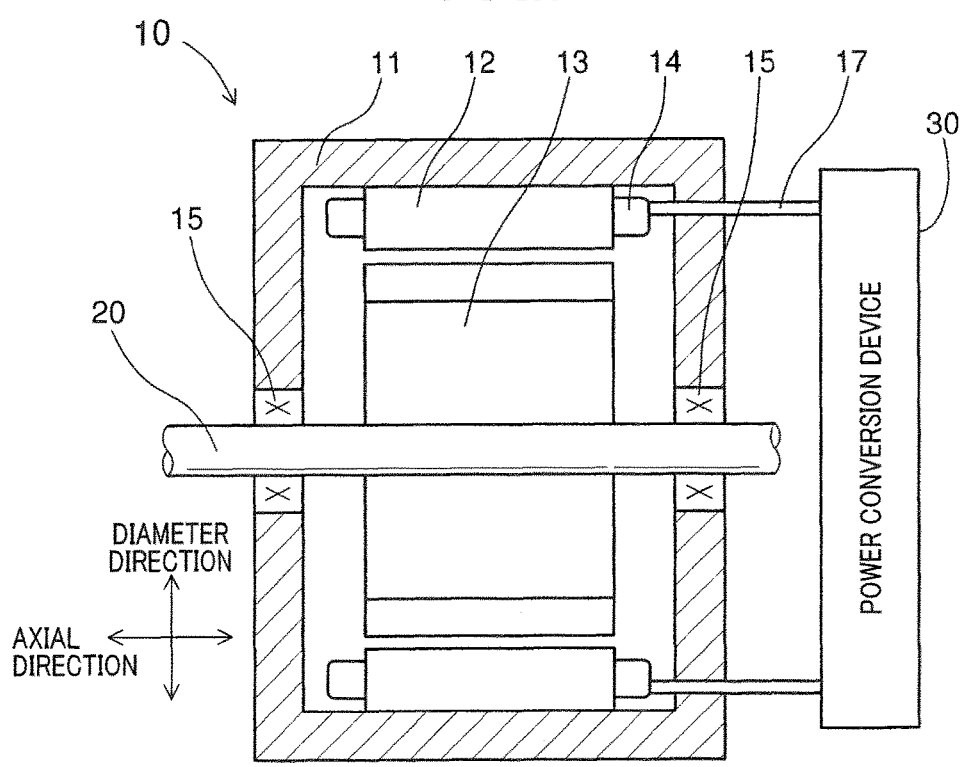
FIG. 1 is a view showing a schematic cross section of a structure of a rotary electric machine having a stator according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a stator 12 and a rotary electric machine 10 equipped with the stator 12 according to a first exemplary embodiment with reference to FIG. 1 to FIG. 19.

FIG. 1 is a view showing a schematic cross section of a structure of the rotary electric machine according to the first exemplary embodiment. The rotary electric machine 10 shown in FIG. 1 is comprised of the stator 12, a rotor 13, a rotary shaft 20, and a casing member 11. The stator 12, the rotor 13 and the rotary shaft 20 are accommodated in the casing member 11. The rotary electric machine 10 is electrically connected to a power conversion device 30 through input and output cables 17, etc. The casing member 11 of the rotary electric machine 10 is independently prepared and fixed to a casing member of the power conversion device 30 by a fixing member, or they are assembled together. The casing member of the power conversion device 30 will be explained later.

For example, there are, as the fixing members, bolts and nuts, male screws and female screws, through holes and split pins, welding, caulking, etc. It is also possible to combine not less than two selected from these fixing members. It is also possible to use extended portions of the conductors 16 as the input and output cables 17. The conductors 16 will be explained in detail later.

The rotary shaft 20 is rotatably supported by the casing member 11 through a bearing 15, etc. The rotary shaft 20 is fixed to a central section of the rotor 13 by the fixing member or the rotary shaft 20 and the rotor 13 are assembled together. The rotary shaft 20 and the rotor 13 rotate together.

Figure 2:
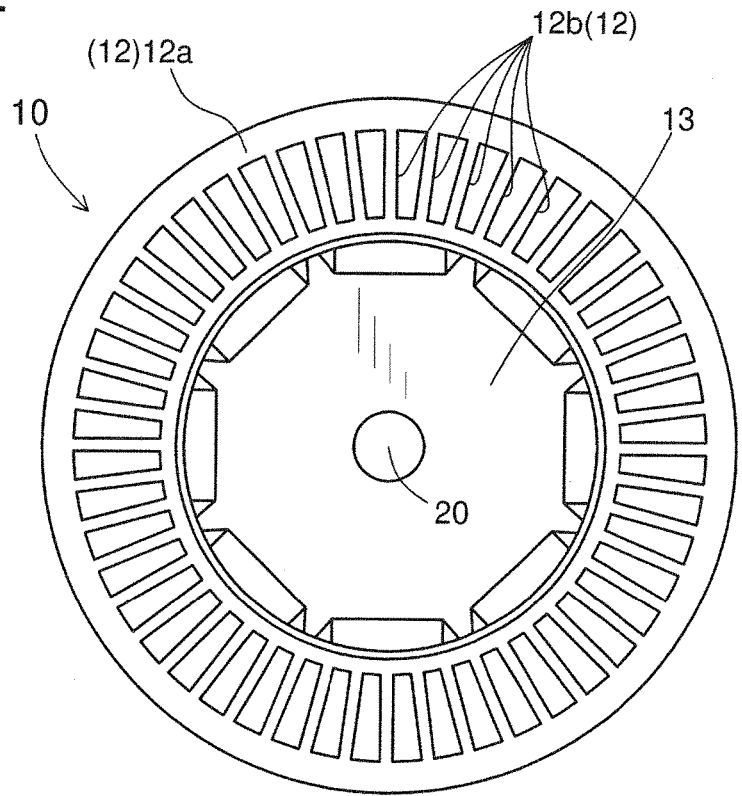
FIG. 2 is a plan view showing a structure of the stator in the rotary electric machine according to the first exemplary embodiment of the present invention.
Figure 3:
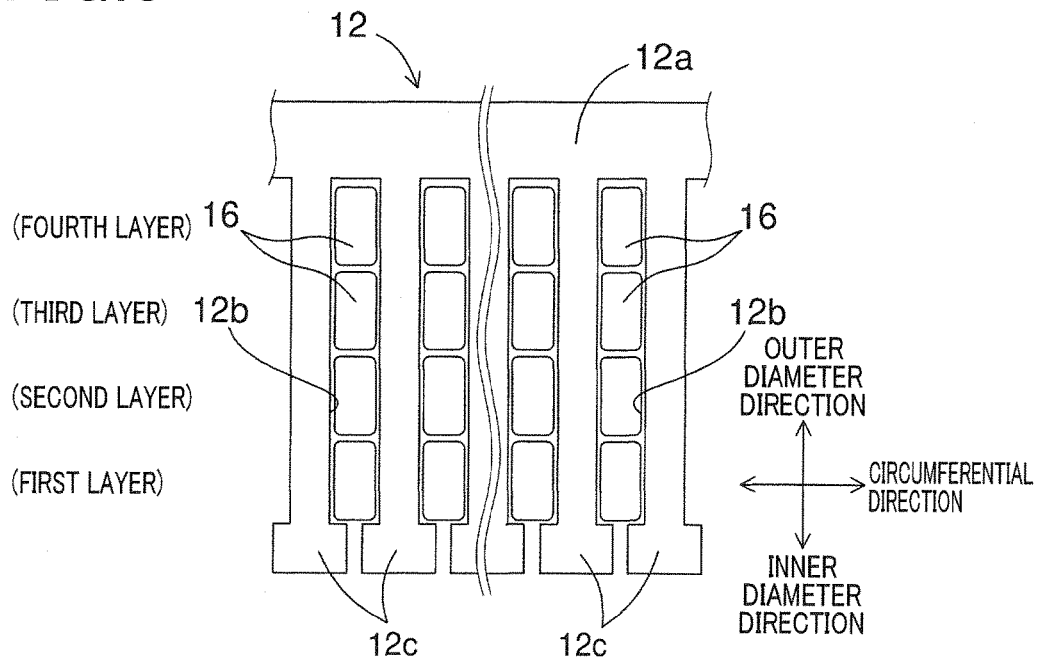
FIG. 3 is a view showing a detailed structure of a part of the stator in the rotary electric machine according to the first exemplary embodiment of the present invention.

FIG. 2 is a plan view showing a structure of the stator 12 in the rotary electric machine 10 according to the first exemplary embodiment. The stator 12 has a stator core 12a. FIG. 3 is a view showing a detailed structure of a part of the stator 12 in the rotary electric machine 10 according to the first exemplary embodiment.

As shown in FIG. 2 and FIG. 3, the stator 12 formed in a cylindrical shape is arranged at a radially outer surface side of the rotor 13. A plurality of slots 12b is formed in the stator core 12a along a circumferential direction of the stator core 12a. The stator 12 is fixed to the casing member 11 (see FIG. 1) by the fixing members. The interval between the adjacent slots 12b can be adjusted. However, from the standpoint of having a uniform magnetic flux flow and increasing an output torque of the rotary electric machine 10, it is preferable to form the slots 12b in the stator core 12a at a regular interval along the circumferential direction of the rotor 11. As shown in FIG. 3, the slot 12b is formed between the adjacent teeth 12c.

In the structure of the stator 12 shown in FIG. 2, the multiplier number S of the slots 12b is two, the number Mn of the magnetic poles is eight, and the number p of the phases is three. Therefore the number Sn of the slots 12b is expressed by the following equation:

$$Sn = S \times Mn \times p = 2 \times 8 \times 3 = 48,$$

where S indicates the multiplier number of slots and is a positive integer, Mn indicates the number of magnetic poles and is a positive integer, and p indicates the number of phases and is a positive integer.

The conductors 16 are accommodated in the slots 12b. The conductors 16 form the phase windings of the stator 12. For example, as shown in FIG. 3, the four conductors 16 are accommodated in each slot 12b so that the four conductors 16 are aligned in a radial direction of the stator core 12a of the stator 12. It is possible to arrange a plurality of the conductors 16 in each slot 12b. In the first exemplary embodiment, each slot 12b is divided into four layers such as a first layer, a second layer, a third layer and a fourth layer. The first layer, the second layer, the third layer and the fourth layer are arranged in each slot 12b from an inner diameter side to the outer diameter side of the stator 12.

A part of each of the conductors 16 which is accommodated in the corresponding slot 12b will be referred to as the "accommodated section 19 of the conductor 16.

Figure 8:
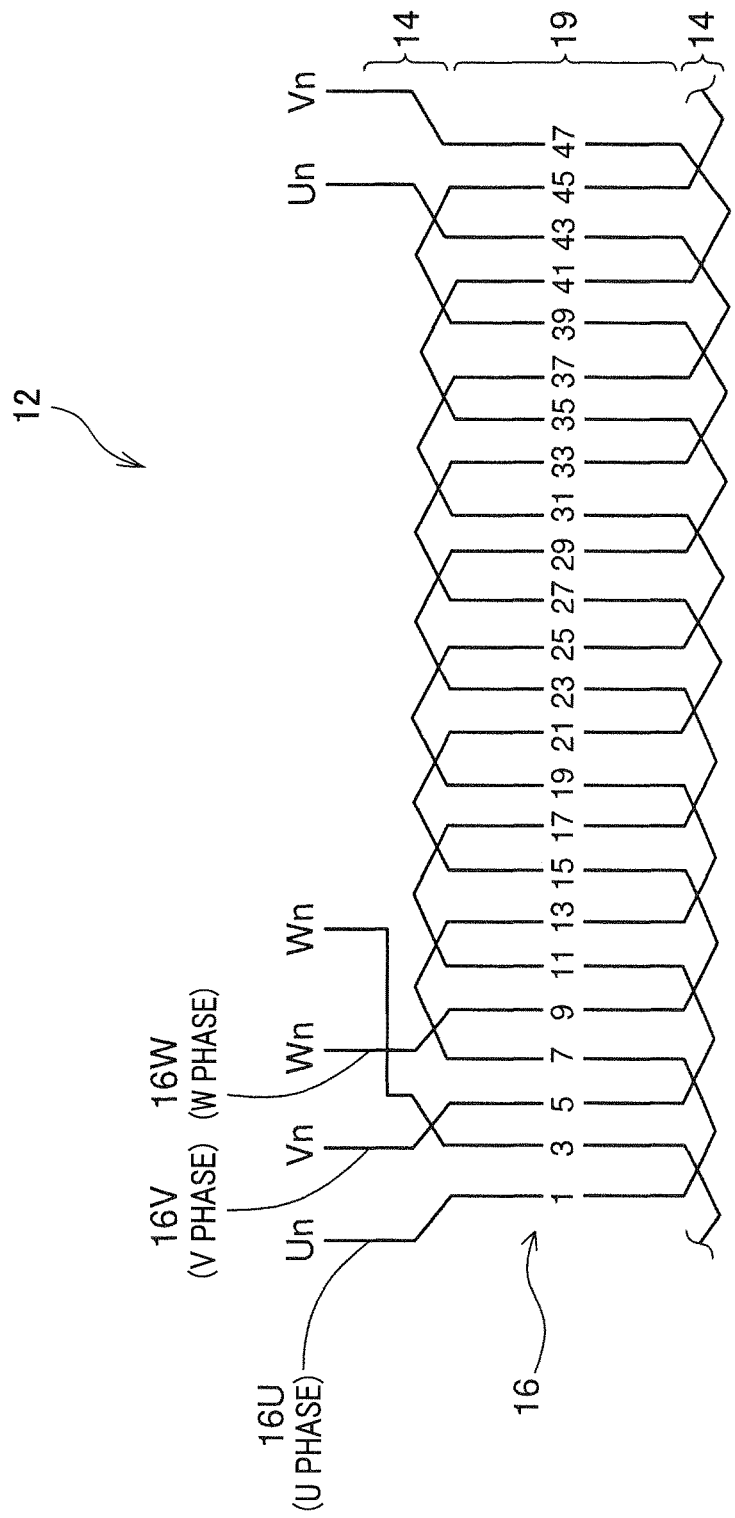
FIG. 8 is a view showing a schematic structure of a part of a wave winding (or a series winding) in which conductors are connected together to form U, V and W phase windings in the rotary electric machine according to the first exemplary embodiment of the present invention.

FIG. 8 is a view showing a schematic structure of the conductors 16 arranged in a wave winding (or a series winding) in which the conductors 16 are connected in series to form the phase winding in the rotary electric machine 10 according to the first exemplary embodiment. A section in the conductor 16, which is exposed and projected from the inside of the slot 12b will be referred to the "turn section 14". The entire of the turn section 14 is called to as the "coil end" of the stator 12. A part of the turn section 14 is used as lead wires. For example, as shown in FIG. 1, the lead wire is electrically connected to the power conversion device 30.

A description will now be given of the structure of the conductors 16 with reference to FIG. 4 and FIG. 5.

Figure 4:
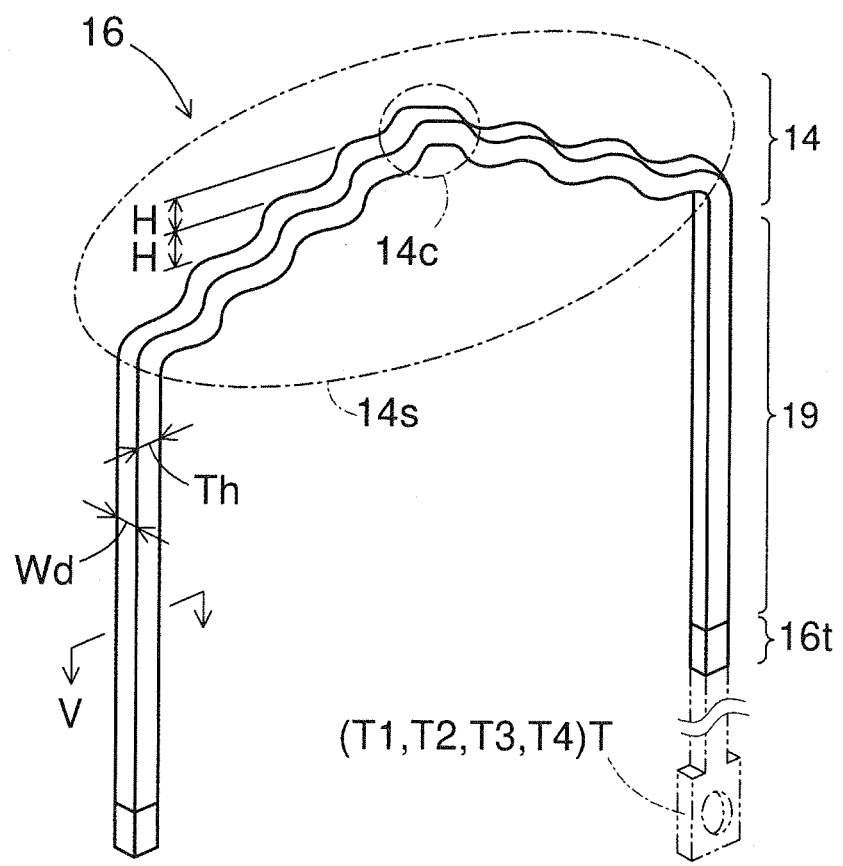
FIG. 4 is a perspective view showing a conductor accommodated in a slot formed in a stator core of the stator in the rotary electric machine according to the first exemplary embodiment of the present invention.

FIG. 4 is a perspective view showing the conductor 16 accommodated in the slot 12a of the stator 12 in the rotary electric machine 10 according to the first exemplary embodiment. FIG. 5 is a view showing a cross section of the conductor 16 accommodated in the slot 12a of the stator 12 in the rotary electric machine 10 according to the first exemplary embodiment.

As shown in FIG. 4, the conductor 16 has a character "U" shape. That is, the conductor 16 is comprised of the turn section 14, the accommodated section 19 and an end section 16t. The turn section 14 has a stair shaped section 14s comprised of a plurality of stair shaped parts. One stair shaped part in the stair shaped section 14s has a height H which can be adjusted to a desired height for various applications. It is possible to easily stack the conductors 16 in an axial direction of the stator 12 when the height H of one stair shaped part in the stair shaped section 14s is formed approximately equal to the height (or a thickness "Th") of the conductor 16. It is possible to adjust the number of the stepped parts in the stair shaped section 14s in the conductor 16. For example, it is possible to determine the number of the stair shaped parts in the stair shaped section 14s on the basis of a gap between the adjacent accommodated sections 19 in the conductor 16.

A crank section 14c is formed at a central part of the stair shaped section 14s. The crank section 14c is obtained by bending a conductor 16 in a crank shape in order to shift the conductor 16 toward a radial direction of the stator 12. The crank section 14c has a maximum height measured from an end surface of the stator core 12a. It is possible to optionally bend the crank section 14c in a radial direction of the stator 12. When the crank section 14c is bent by a width Wd of the conductor 16, it is possible to easily shift the conductor 16 toward the radial direction of the stator 12.

It is also possible for each of the conductors 16 to have a structure without the stair shaped section 14s. It is possible for the rotary electric machine to have the same effects so long as each of the conductors 16 has the crank section 14c without the stair shaped section 14s.

Figure 7:
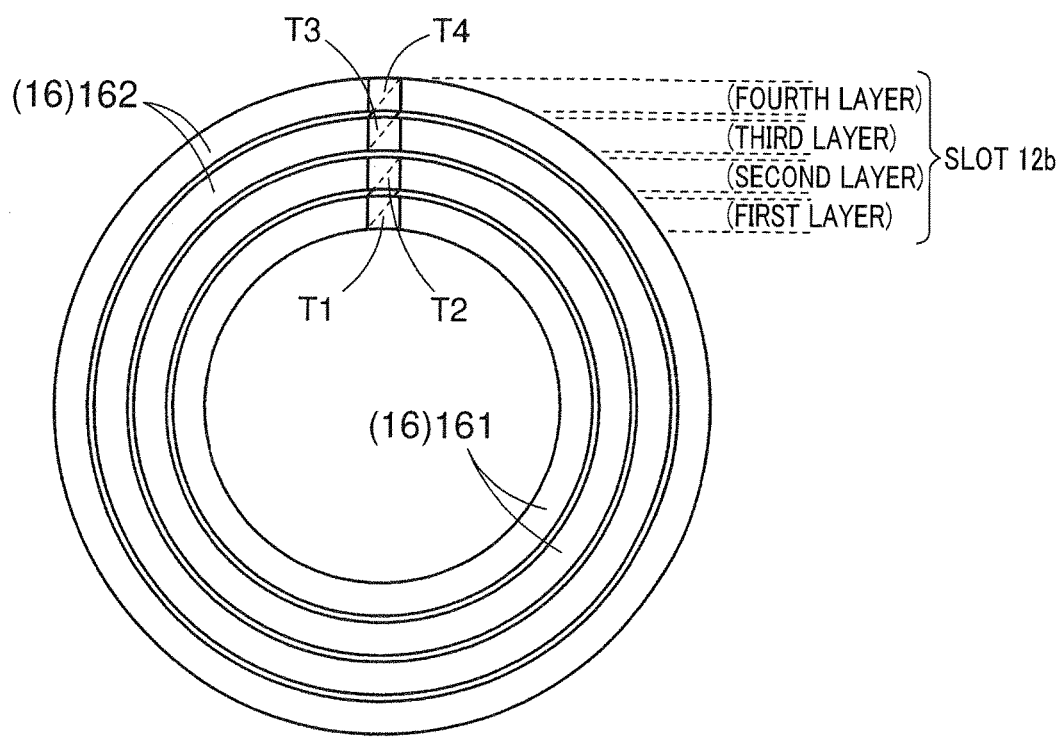
FIG. 7 is a view showing a schematic structure of windings 161 and 162 which are wound in two layer groups such as first and second layers, and third and fourth layers in a slot of the stator of the rotary electric machine according to the first exemplary embodiment of the present invention.

FIG. 7 is a view showing a schematic structure of windings 161 and 162 in U phase windings in the stator 12 of the rotary electric machine 10 according to the first exemplary embodiment. The windings 161 and 162 are wound in two layer groups, that is, first and second layers, and third and fourth layers.

The end section 16t of some conductors 16 has a terminal section T, for example, the end sections of the windings 161 and 162 shown in FIG. 7 which will be explained later. The terminal section T is designated by the alternate long and two short dashes line shown in FIG. 4.

The end sections 16t are connected by soldering or welding. Similarly, the end section 16t is electrically connected to the terminal section T by soldering or welding.

The technical term "welding" indicates fusion welding such as gas welding, arc welding, electroslag welding, electron beam welding, laser beam welding, etc., and pressure welding such as resistance welding, forge welding, etc.

Figure 5:
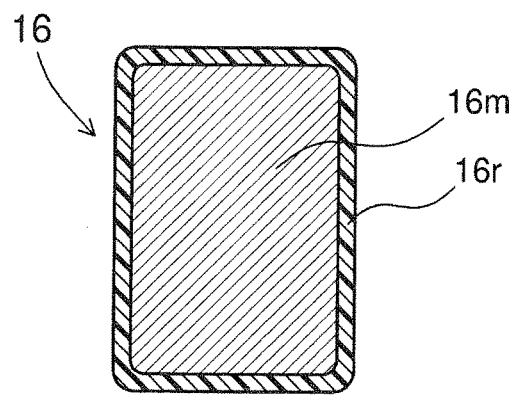
FIG. 5 is a view showing a cross section of the conductor to be inserted and accommodated in a corresponding slot of the stator in the rotary electric machine according to the first exemplary embodiment of the present invention.

FIG. 5 shows a cross section of the conductor 16 along the V-V line shown in FIG. 4. The turn section 14 and the accommodated sections 19 in the conductor 16 are covered with an insulation film 16r for example, a resin film, etc. That is, the turn section 14 is made of a metal member 16m, for example, a copper wire, etc. and the accommodated sections 19 are covered with the insulation film 16r. On the other hand, because the end section 16t in the conductor 16 is not covered with the insulation film, the metal member 16m in the end section 16t is exposed to the outside and the end section 16t is electrically connected to the terminal T or the end section of other conductors 16.

Figure 6:
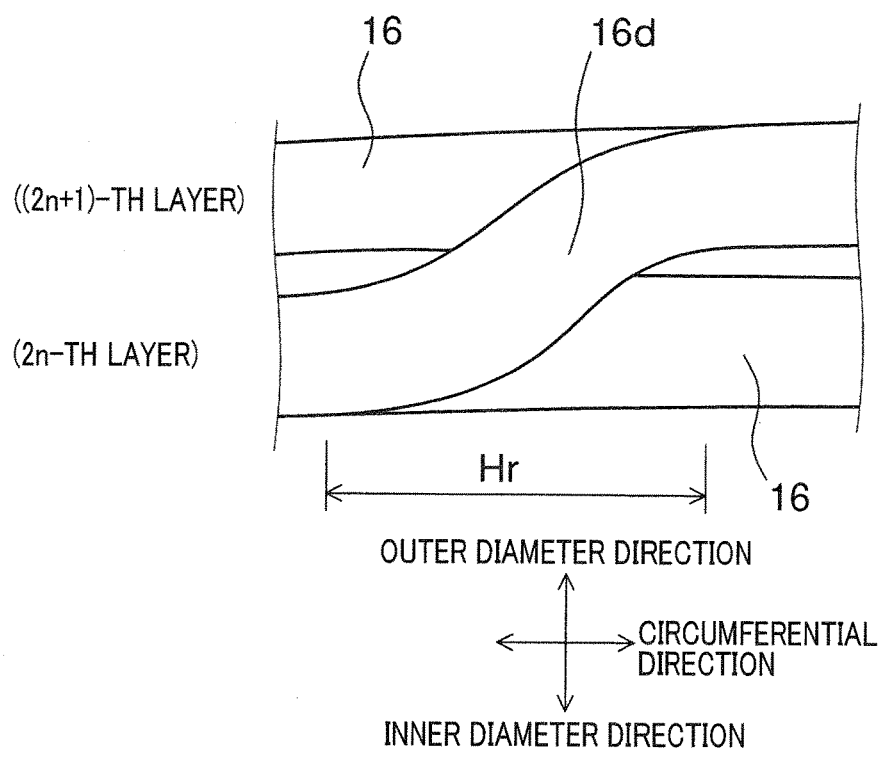
FIG. 6 is a view showing a structure of a layer connecting conductor 16$d$ to connect conductors in the (2n+1)-th layer and 2n-th layer in a slot in the stator of the rotary electric machine according to the first exemplary embodiment of the present invention.

FIG. 6 is a view showing a structure of a layer connecting conductor 16d in the stator 12 of the rotary electric machine 10 according to the first exemplary embodiment. The layer connecting conductor 16d has a crank shape and connects the 2n-th layer (for example, winding 161) to the (2n+1)-th layer (for example, winding 162). The layer connecting conductor 16d is disposed at a front side and another conductor 16 is disposed at a rear side (or a back side) shown in FIG. 6. Because the layer connecting conductor 16d is disposed at the horizontal section Hr formed at the central section of another conductor 16, no interference occurs between the layer connecting conductor 16d and another conductor 16 as shown in FIG. 6, FIG. 9, FIG. 10 and FIG. 11. The structure of the conductors shown in FIG. 9, FIG. 10 and FIG. 11 will be explained later.

FIG. 7 shows a schematic connection of the conductors 16 which belong to one phase winding, for example, U phase. The winding 161 is formed by sequentially connecting the conductors 16 in the first layer and the second layer. One end section of the phase winding 161 is electrically connected to a terminal T1, and the other end section of the phase winding 161 is electrically connected to a terminal T2. The winding 162 is formed by sequentially connecting the conductors 16 in the third layer and the fourth layer. One end section of the winding 162 is electrically connected to a terminal T3, and the other end section of the winding 162 is electrically connected to a terminal T4. Each of the terminals T1, T2, T3 and T4 corresponds to the terminal T of the conductor 16 shown in FIG. 4. The winding 161 and the phase and the winding 162 are formed by connecting the conductors 16 in the two layers which are radially adjacent to each other.

Because the rotary electric machine according to the first exemplary embodiment has three phase (for example, U phase, V phase and W phase), each of the three phases has the windings 161 and 162. It is not necessary that each of the windings 161 and 162 is equipped with the terminal T.

FIG. 8 shows an example of connecting the windings 161 and 162 in three phases. That is, the winding 161 makes the U phase winding 16U. The winding 161 makes the V phase winding 16V. The winding 161 makes the W phase winding 16W. Similarly, the winding 162 makes the U phase winding 16U. The winding 162 makes the V phase winding 16V. The winding 162 makes the W phase winding 16W. It is possible to determine the number of the windings 161 and 162 to be used in each of the three phases U, V and W.

The stator 12 shown in FIG. 8 is comprised of the U phase winding 16U, the V phase winding 16V and the W phase winding 16W. In the structure of the stator 12 according to the first exemplary embodiment, a pair of the slots 12b forms each phase. Each of the conductors 16 shown in FIG. 8 is designated by its number which indicates the number of the corresponding slot in which the conductor 16 is accommodated in the U phase winding 16U, the V phase winding 16V and the W phase winding 16W. For example, the conductor 16 indicated by the reference number 1 is inserted and accommodated in the slot 12b having the slot number 1.

The U phase winding 16U as one of the three phase windings U, V and W is comprised of the conductors 16 which are connected in series and accommodated in the slots 12b designated by the slot numbers 1, 7, 13, 19, 25, 31, 37 and 43, respectively. As omitted from the drawings, the U phase winding 16U is comprised of the conductors 16 which are connected in series and accommodated in the slots 12b designated by the slot numbers 2, 8, 14, 20, 26, 32, 38 and 43, respectively. One U phase winding 16U is electrically connected to the other U phase winding 16U at the connection section Un.

The V phase windings 16V and the W phase windings 16W have the same structure of the U phase windings 16U. That is, one V phase winding 16V is comprised of the conductors 16 which are connected in series and accommodated in the slots 12b designated by the slot numbers 3, 9, 15, 21, 27, 33, 39, and 45 respectively. Similar to the structure of the U phase windings 16U, one V phase winding 16V is electrically connected to the other V phase winding 16V at the connection section Vn. The W phase winding 16W is comprised of the conductors 16 which are connected in series and accommodated in the slots 12b designated by the slot numbers 5, 11, 17, 23, 29, 35, 41, and 47 respectively. Similar to the structure of the U phase windings 16U and 16V, one W phase winding 16W is electrically connected to the other W phase winding 16W at the connecting section Wn.

As previously described, the U phase windings 16U, the W phase windings 16V and the W phase windings 16W are formed by winding the conductors 16 in the corresponding slots 12b.

A description will now be given of a part of the phase windings, in particular the turn section 14 in each of the phase windings with reference to FIG. 9, FIG. 10 and FIG. 11.

Figure 9:
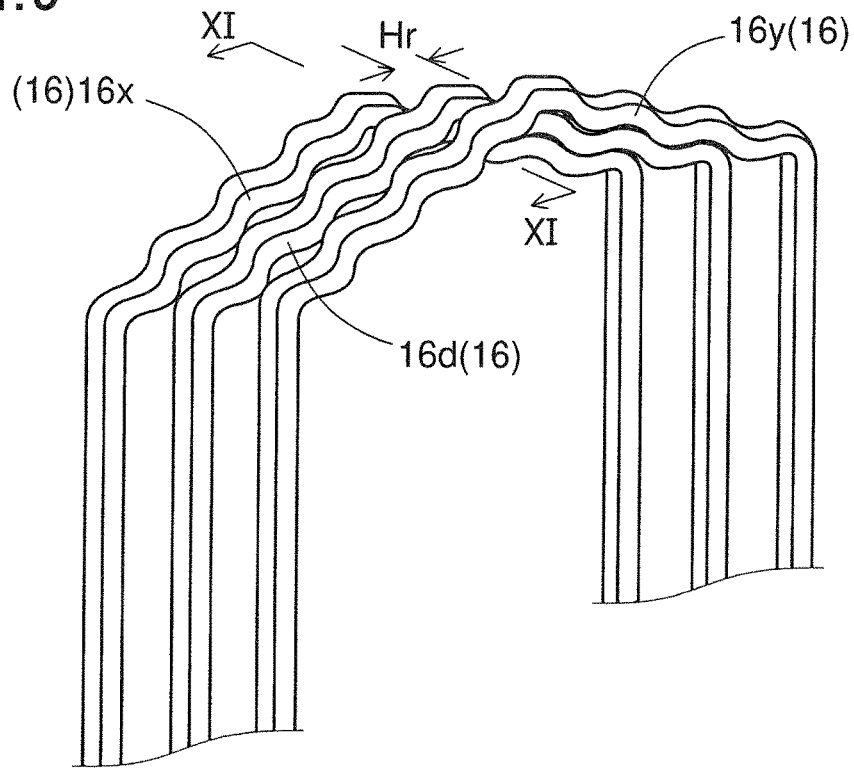
FIG. 9 is a perspective view showing a part of the turn sections of the windings forming the phase winding in the stator of the rotary electric machine according to the first exemplary embodiment of the present invention.

FIG. 9 is a perspective view showing a part of the turn sections of the windings forming the phase windings in the stator 12 of the rotary electric machine 10 according to the first exemplary embodiment. FIG. 10 is a plan view showing a relationship between teeth 12c, the slots 12b, the conductors 16x (16) and 16y (16) and the layer connecting conductor 16d (16) in the stator 12 of the rotary electric machine 10 according to the first exemplary embodiment. FIG. 11 is a view showing a cross section of the conductors 16 along the XI-XI Line shown in FIG. 9.

Figure 10:
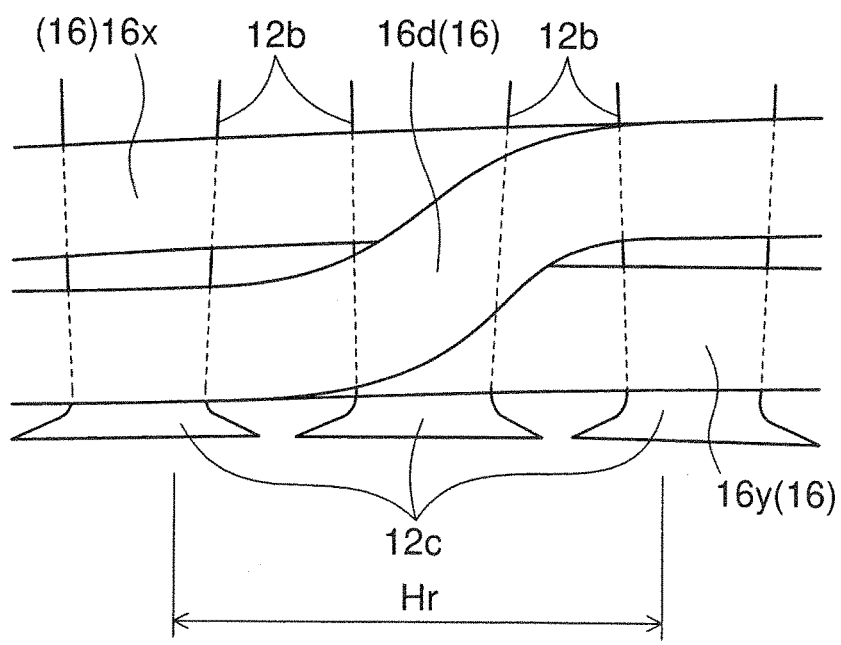
FIG. 10 is a plan view showing a relationship between teeth, slots and conductors in the stator of the rotary electric machine according to the first exemplary embodiment of the present invention.
Figure 11:
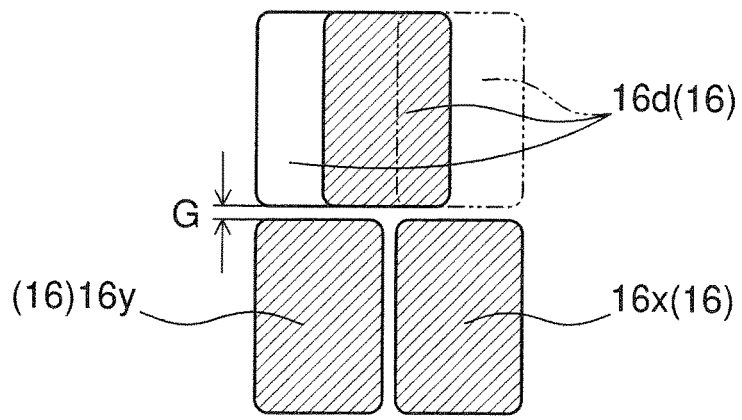
FIG. 11 is a view showing a cross section of the conductors along the XI-XI Line shown in FIG. 9.

That is, FIG. 9, FIG. 10 and FIG. 11 shows the conductor 16x in the 2n layer, the conductor 16y in the (2n+1) layer, and the turn sections 16*d* through which the conductor 16*x* in the 2n layer is switched to the conductor 16*y* in the (2n+1) layer.

FIG. 10 shows the conductor as the layer connecting conductor 16*d* which is bent in the horizontal section Hr formed at the central section of the conductors 16*x* (16) and 16*y* (16). As shown in FIG. 11, a gap "G" is formed between the layer connecting conductor 16*d*, the conductor 16*x* and the conductor 16*y*. There is therefore no interference between the layer connecting conductor 16*d*, the conductor 16*x* and the conductor 16*y*.

Next, a description will now be given of a method of connecting the windings 161 and 162 (the U phase winding 16U, the V phase winding 16V and the W phase winding 16W) with reference to FIG. 12 to FIG. 17.

Figure 12:
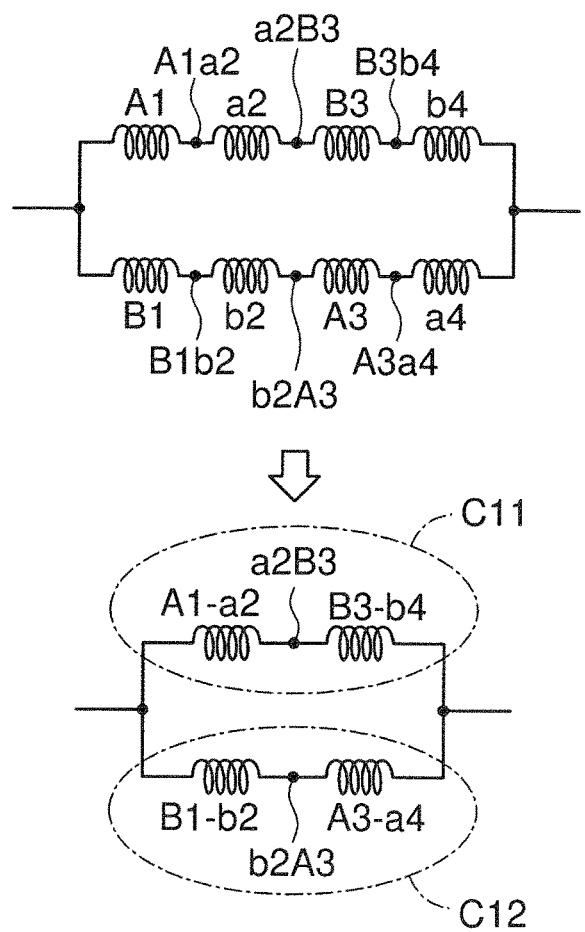
FIG. 12 is a view showing a schematic circuit structure of a first connection example of the conductors in which the conductors are divided into two parallel connections arranged in parallel.
Figure 13:
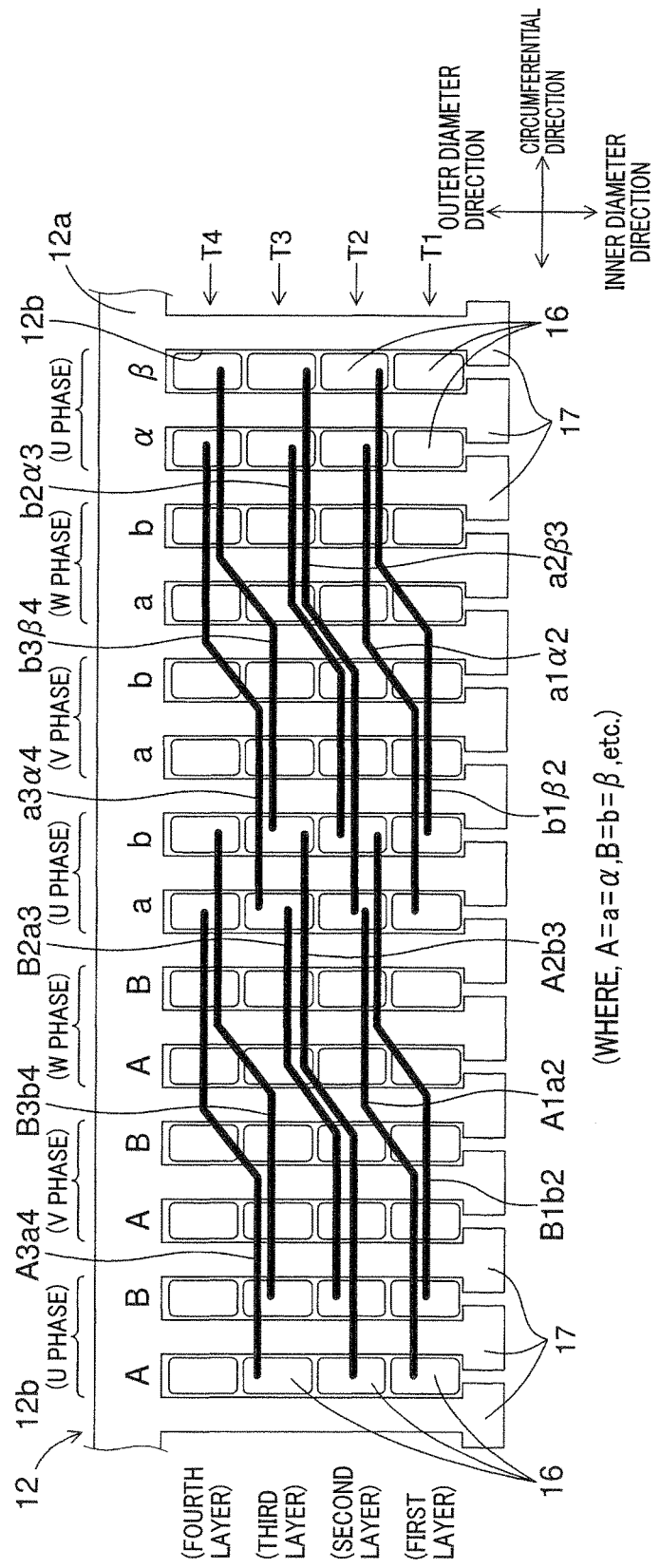
FIG. 13 is a plan view showing a phase connection in which the conductors are arranged in the double slots (the multiplier number S of slots is two (S=2)) in the stator of the rotary electric machine according to the first exemplary embodiment of the present invention.

FIG. 12 is a view showing a schematic circuit structure of a first connection example of the conductors in which the conductors are divided into two parallel connections arranged in parallel. FIG. 13 is a plan view showing a phase connection in which the conductors are arranged in the slots when the multiplier number S of slots is two (S=2) in the stator 12 of the rotary electric machine 10 according to the first exemplary embodiment.

In the winding connection shown in FIG. 12 to FIG. 17, two series circuit sections are connected in parallel per phase winding. That is, FIG. 12 to FIG. 17 show an example of a parallel connection of the two of phase windings. The total number of the series circuit sections connected in parallel is referred to as the "parallel number". In the stator 12 according to the first exemplary embodiment, the parallel number is two.

The upper part in FIG. 12 shows an example of a winding connection composed of windings A1, a2, B3, b4, B1, b2, A3, and a4 which are connected in series.

As shown in FIG. 13, the winding A1 is wound, i.e. accommodated in the first layer of the slot A in the double slots 12*b*. The winding a2 is wound, i.e. accommodated in the second layer of the slot a in the double slots 12*b*. Further, as shown in FIG. 13, the winding B1 is wound, i.e. accommodated in the first layer of the slot B in the double slots 12*b*. The winding b2 is wound, i.e. accommodated in the second layer of the slot b in the double slots 12*b*. Other windings B3, b4, A3 and a4 are wound by the same structure.

The windings 161 and 162 shown in FIG. 7 are wound twice on the stator 12 through the layer connection sections 16*d*. The duplex windings A1-*a2* are comprised of the winding A1 and the winding a2 connected by the connection conductor A1*a2*. The duplex windings B3-*b4* are comprised of the winding B3 and the winding b4 connected by the connection conductor B3*b4*. The duplex windings B1-*b2* are comprised of the winding B1 and the winding b2 connected by the connection conductor b2A3. The duplex windings A3-*a4* are comprised of the winding A3 and the winding a4 connected by the connection conductor A3*a4*. The bottom side of FIG. 12 shows an example of a simplified structure of the winding connection at the upper side of FIG. 12.

A description will now be given of various examples of the winding connection by using the double windings which are wound around the stator 12 of the rotary electric machine 10 according to the first exemplary embodiment.

FIG. 13 shows an example of the connection state of the layer connection conductor through which the windings in different layers are connected. In the structure of the stator 12 having the double slot structure (i.e. the multiplier number S of the slots 12*b* is two (S=2)), the one phase winding uses adjacent two slots. Each of the U phase winding, the V phase winding and the W phase winding is assigned to the adjacent two slots 12*b*. A group of the U phase winding, the V phase winding and the W phase winding uses every six slots 12*b*. For a brief explanation, as shown in FIG. 13, a left side slot in a pair of the adjacent slots 12*b* as the double slots is designated by reference character "A", and the right side slot therein is designated by reference character "B". When the winding in one phase strides over the winding in other phase, a left side slot in a pair of the adjacent slots 12*b* as the double slots is designated by reference character "a", and the right side slot therein is designated by reference character "b", and a left side slot in a pair of the adjacent slots 12*b* is designated by reference character "α", and the right side slot therein is designated by reference character "β". The slot A, the slot a and the slot α are arranged at the left side in the corresponding pair of the slots. On the other hand, the slot B, the slot b and the slot β are arranged at the right side in the corresponding pair of the slots as the double slots. In other words, the slot A, the slot a and the slot α are the same side in the pair of the adjacent slots as the double slots (A=a=α). Similarly, the slot B, the slot b and the slot β are on the same side in the pair of the adjacent slots as the double slots (B=b=β). In addition, although an actual stator has an arc shape or a circular shape, FIG. 13 shows that the stator 12 has a rectangle shape for brief explanation.

As shown in FIG. 13, the connection conductor A1*a2* connects the conductor A1 accommodated in the first layer in the slot A with the conductor a2 in the second layer in the slot a. Similarly, the connection conductor B1*b2* connects the conductor B1 accommodated in the first layer in the slot B with the conductor b2 in the second layer in the slot b. The connection conductor A2*b3* connects the conductor A2 accommodated in the second layer in the slot A with the conductor b3 in the third layer in the slot b. The connection conductor B2*a3* connects the conductor B2 accommodated in the second layer in the slot B with the conductor a3 in the third layer in the slot a.

The connection conductor A3*a4* connects the conductor A3 accommodated in the third layer in the slot A with the conductor a4 in the fourth layer in the slot a. The connection conductor B3*b4* connects the conductor B3 accommodated in the third layer in the slot B with the conductor b4 in the fourth layer in the slot b. It is also acceptable to use the layer connecting conductor 16*d* as one or more of these connection conductors A1*a2*, B1*b2*, A2*b3*, B2*a3*, A3*a4* and B3*b4*.

Figure 14:
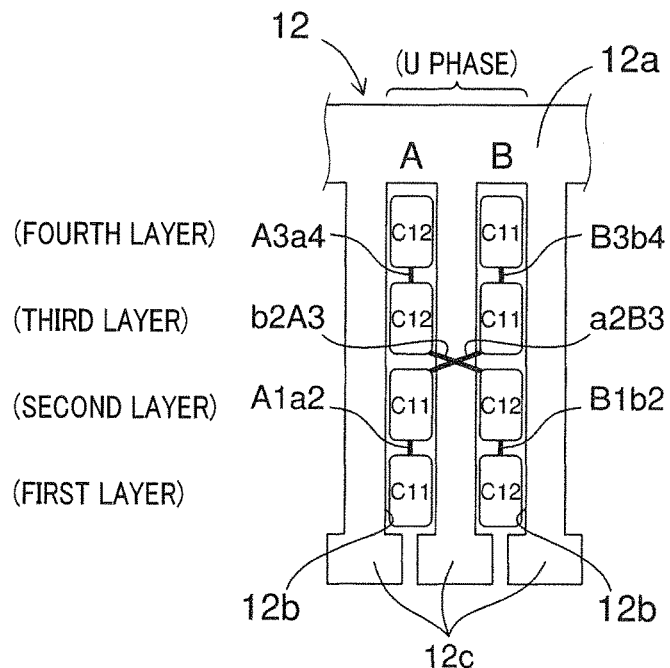
FIG. 14 is a plan view which schematically shows a relationship between a series circuit section and the conductors accommodated in the slots in the stator of the rotary electric machine according to the first exemplary embodiment of the present invention.

As understood from the examples of the winding connection shown in FIG. 12 and FIG. 13, it is possible to show the winding connection by using the pair of the slot A and the slot B shown in FIG. 14.

FIG. 14 is a plan view which schematically shows a relationship between the series circuit section and the conductors accommodated in the slots A and B of the stator 12 of the rotary electric machine 10 according to the first exemplary embodiment.

The series circuit C11 designated by the alternate long and short dash line in the bottom part of FIG. 12 is made by the series connection composed of the winding A1, the connection conductor A1*a2*, the winding a2, the connection conductor a2B3, the winding B3, the connection conductor B3*b4*, and the winding b4. Similarly, the series circuit section C12 designated by the alternate long and short dash line in the bottom part of FIG. 12 is made by the series connection composed of the winding B1, the connection conductor B1*b2*, the winding b2, the connection conductor b2A3, the winding A3, the connection conductor A3*a4*, and the winding a4. The conductors 16 (i.e. the winding 161 and the winding 162) are connected in n layers (n=4 in the first exemplary embodiment) to make the connection in each of the series circuit sections C11 and C12, According to the first exemplary embodiment as previously described, the series circuit C11 and the series circuit C12 are composed of the same number of the conductors in the slot 12*b* designated by the reference character "A" at the left side and the slot 12*b* designated by the reference character "B" at the left side in the pair of the adjacent slots. The connection conductor a2B3 in the series circuit C11 and the connection conductor b2A3 in the series circuit C12 connect the conductors in the different slots. The windings accommodated in the pair of the slots A and B which are adjacently arranged have in general a different electric potential. However, as shown in FIG. 14, because the layer connection shown in FIG. 14 makes it possible to eliminate such a different electric potential, it is possible to prevent a circulating current from being generated in the series circuit as a closed circuit shown in FIG. 12, and to prevent loss caused by the circulating current.

Figure 15:
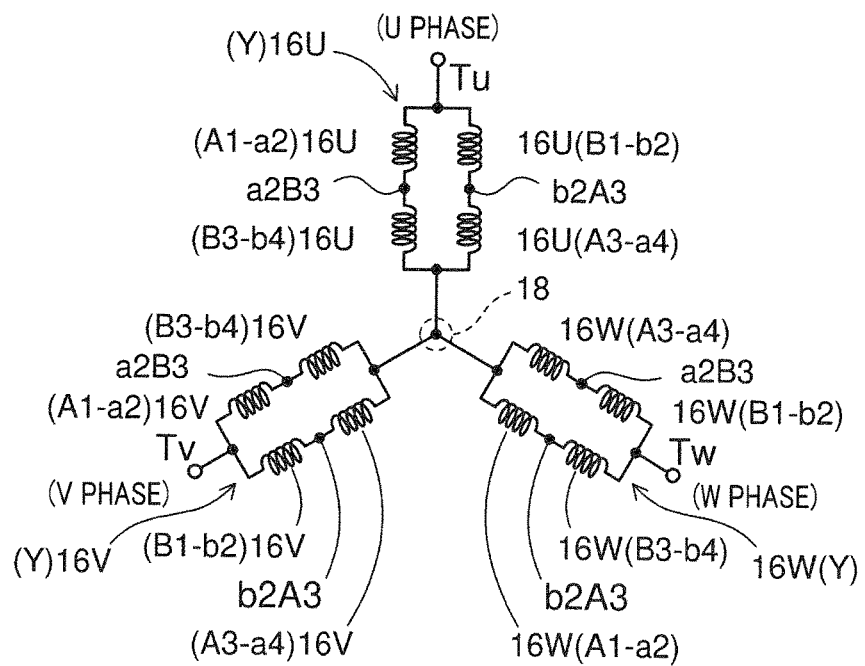
FIG. 15 is a schematic view showing a first wire connection structure (a star connection) of the phase windings in the stator of the rotary electric machine according to the first exemplary embodiment of the present invention.
Figure 16:
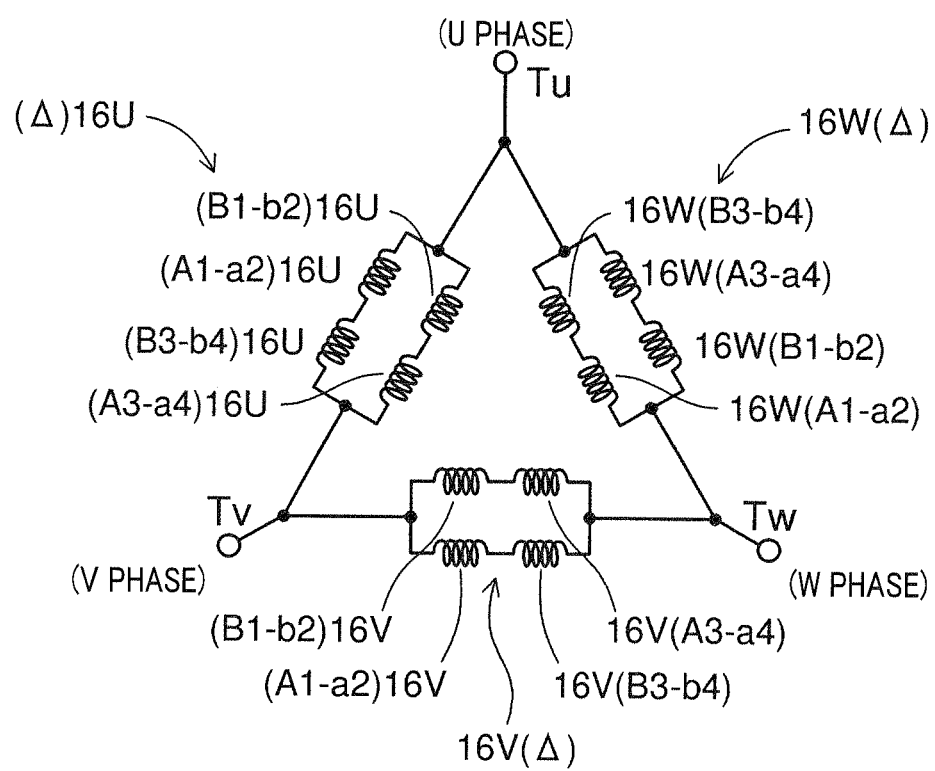
FIG. 16 is a schematic view showing a second wire connection structure (or a delta connection) of the phase windings in the stator of the rotary electric machine according to the first exemplary embodiment of the present invention.
Figure 17:
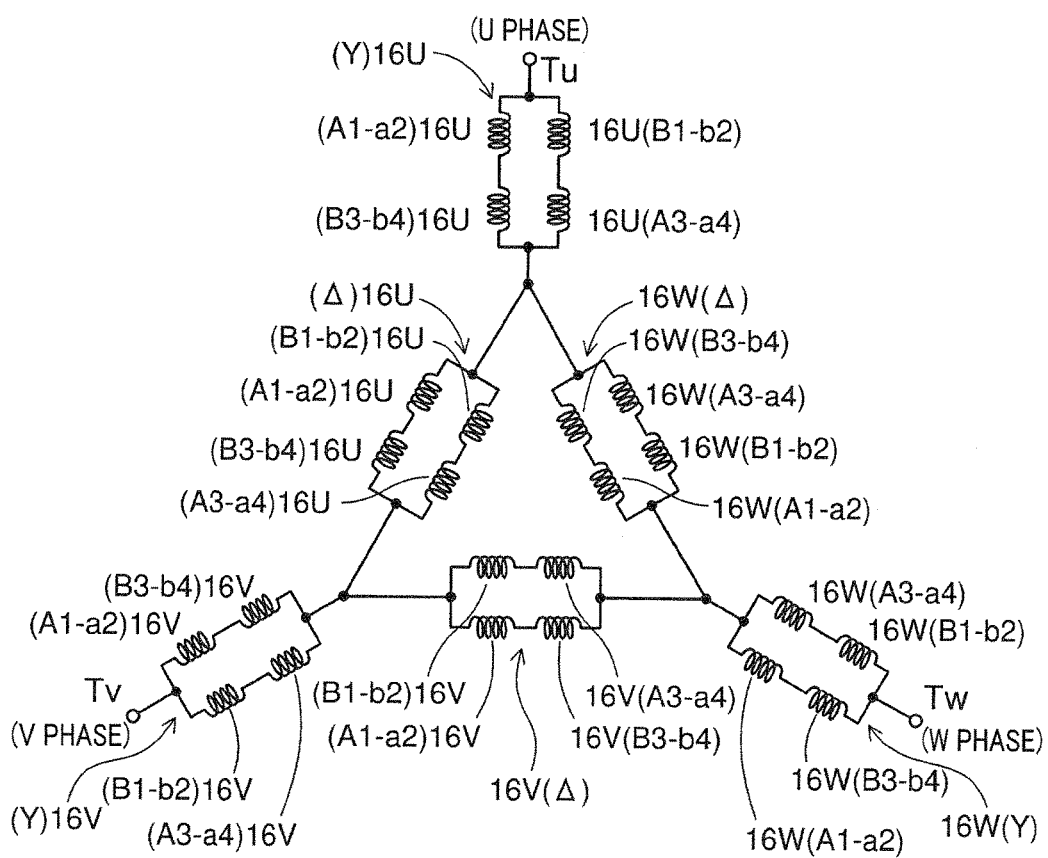
FIG. 17 is a schematic view showing a third wire connection structure (a star delta composite connection) of the phase windings in the stator of the rotary electric machine according to the first exemplary embodiment of the present invention.

When the connection example of one phase winding shown in FIG. 12, FIG. 13 and FIG. 14 is applied to the three phase windings shown in FIG. 15, FIG. 16 and FIG. 17, each of the windings shown in FIG. 15, FIG. 16 and FIG. 17 are connected in parallel. The same connection is designated by the same reference character.

FIG. 15 is a schematic view showing a first wire connection structure as a star (Y) connection composed of the U phase winding 16U, the V phase connection 16V and the W phase winding 16W in the stator 12 of the rotary electric machine 10 according to the first exemplary embodiment.

FIG. 16 is a schematic view showing a second wire connection structure (or a delta (Δ) connection) composed of the U phase winding 16U, the V phase connection 16V and the W phase winding 16W in the stator 12 of the rotary electric machine 10 according to the first exemplary embodiment. FIG. 17 is a schematic view showing a third wire connection structure composed of the star connection shown in FIG. 15 and the delta connection shown in FIG. 16 as a Y-delta (Δ) composite connection in the stator 12 of the rotary electric machine 10 according to the first exemplary embodiment.

It is possible to use the end part of the windings 161 and 162 or the terminals T (T1, T2, T3 and T4), or the input and output cables 17 shown in FIG. 1 as the terminals Tu, Tv and Tw shown in FIG. 15, FIG. 16 and FIG. 17.

When the end sections of the windings 161 and 162, the terminals Tu, Tv and Tw as the terminal T, and the input and output cables 17 are arranged at a concentrated area in the stator 12, it is possible to easily connect them together.

Figure 18:
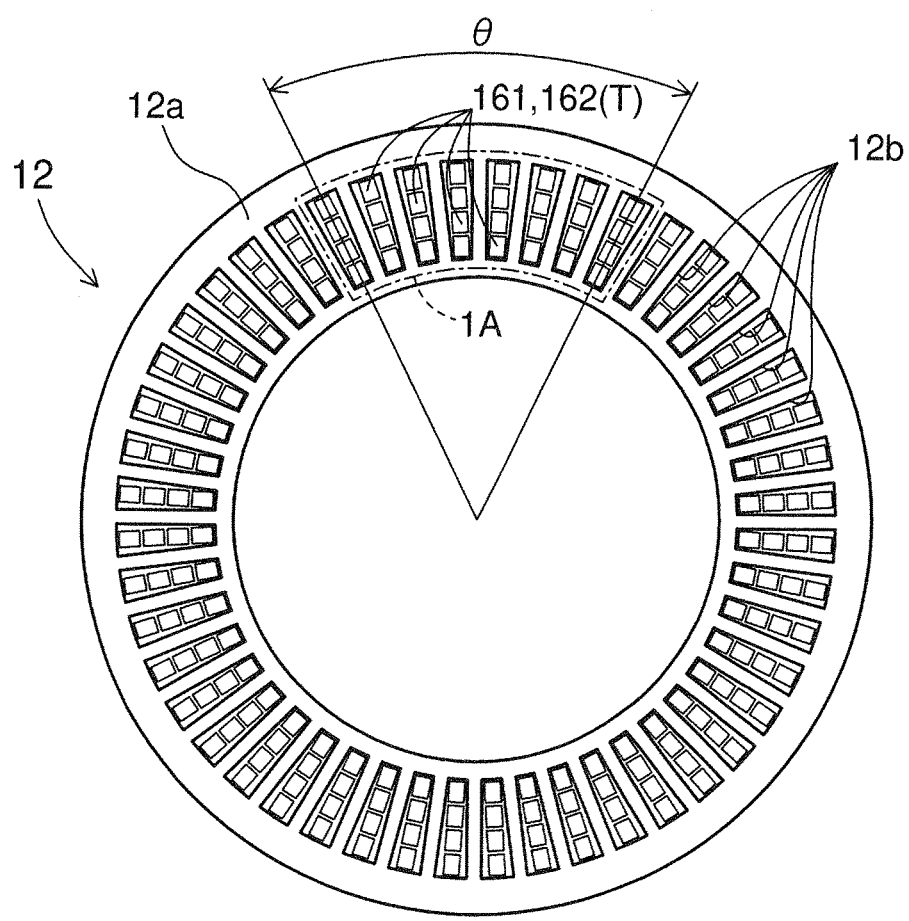
FIG. 18 is a plan view showing a schematic structure of a wire connection part of the phase windings of the stator of the rotary electric machine according to the first exemplary embodiment of the present invention.

FIG. 18 is a plan view showing a schematic structure of a wire connection part of the phase windings in the stator 12 of the rotary electric machine 10 according to the first exemplary embodiment.

As shown in FIG. 18, the bonding section 1A is formed at a concentrated area of the stator 12. The bonding section 1A occupies an area, within one round of the stator 12, i.e. having an angle θ (0°<θ<360°) in the stator 12. It is possible to use a terminal block as the bonding section 1A.

FIG. 15, FIG. 16 and FIG. 17 show an example of the winding connection. However, it is possible to combine the star connection, the delta connection and a combination of the star connection and the delta connection according to various applications. The structure shown in FIG. 19 uses the rearranging section 1B with which the connection is switched on the basis of a rearranging signal SW transmitted from the power conversion device 30. The power conversion device 30 also transmits an electric power conversion signal Es in addition to the rearranging signal SW.

The rearranging section 1B is realized by using a relay device (which contains a semiconductor relay). The U phase winding circuit U1, U2, the Y phase winding circuits V1, V2 and the W phase winding circuits W1 and W2 are electrically connected to the rearranging section 1B. Specifically, the connection sections Un, Vn and Wn in each of the phase winding circuits are electrically connected to the rearranging section 1B.

Figure 19:
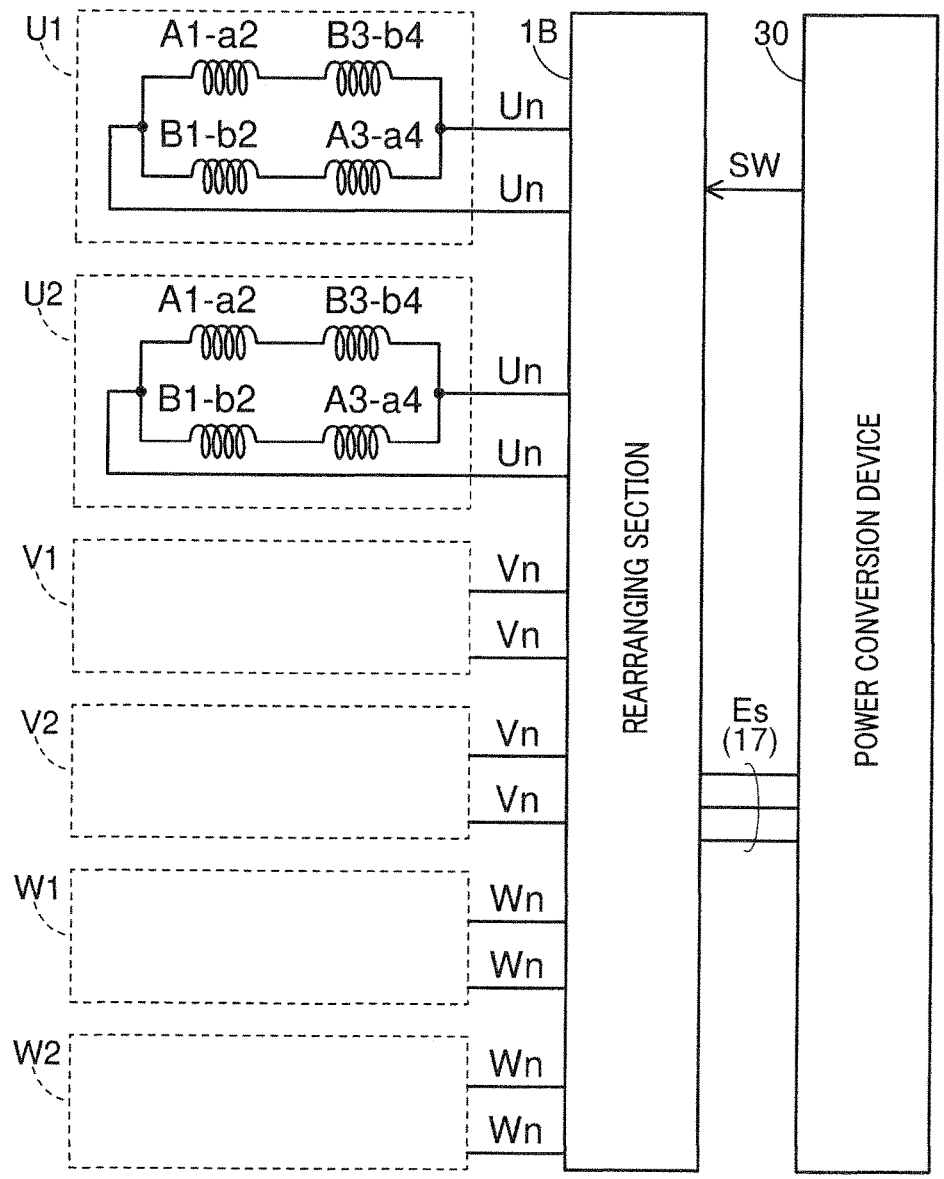
FIG. 19 is a schematic view of a first structure of rearranging the wire connection of the phase windings of the stator by a rearranging section 1B in the rotary electric machine according to the first exemplary embodiment of the present invention.

FIG. 19 is a schematic view of the first structure of rearranging the wire connection of the phase windings of the stator 12 by the rearranging section 1B in the rotary electric machine 10 according to the first exemplary embodiment.

FIG. 19 shows the twelve connection nodes Un, Vn and Wn (i.e. U1, U2, V1, V2, W1 and W2) which are used for the three phase windings in the slots A and B shown in FIG. 13. Because there are slots a and b, and slots I and J in addition to the slots A and B used by the three phase windings, it is necessary to use thirty two connection sections. It is also possible to use the connection conductors A1*a*2, A2*b*3, B2*a*3, A3*a*4 and B3*b*4 as the connection sections to be connected to the rearranging section 1B. The rearranging section 1B receives the rearranging signal SW transmitted from the power conversion device 30, and selects one of the star connection, the delta connection, and star-delta connection of the phase windings on the basis of the received rearranging signal SW.

For example, the structure having the rearranging section 1B shown in FIG. 19 can select the optimum connection according to various applications, for example, when a vehicle speed is low and the vehicle needs a large torque, or when a vehicle speed is high and it is sufficient for the vehicle to have a low torque.

A description will now be given of the rotary electric machine according to the first exemplary embodiment having the above structure previously described.

As shown in FIG. 1, when receiving the electric power conversion signal Es transmitted from the power conversion device 30, the stator 12 is excited. When the stator 12 is excited, a rotary torque is generated by exciting the stator 12 and the rotary 13 rotates thereby. In this case, the rotary electric machine 10 acts as an electric motor. It is possible to output the generated torque generated in the rotary electric machine 10 to rotary devices such as vehicle wheels and propellers through the rotor 13. It is also acceptable to arrange a power transmission mechanism between the rotor 13 and the rotary devices (not shown). For example, the power transmission mechanism is one or more of a rotary shaft, a cam, a rack and a pinion, a gear, etc.

On the other hand, because the rotor 13 rotates by a rotary power of the rotary device when the power conversion device 30 outputs no electric power conversion signal Es and the rotary device generates the rotary power (which contains a motive power), a counter electromotive force is generated in the stator 12 (specifically, generated in the windings 161 and 162). The generated counter electromotive force (a regenerative force) can be charged to a battery (omitted from the drawings) through the power conversion device 30. In this case, the rotary electric machine 10 acts as an electric power generator or alternator.

By the way, even if the rotary device generates a rotary power, when the power conversion device 30 transmits the electric power conversion signal Es, the stator 12 generates a rotary torque and the rotor 13 outputs the generated rotary torque to the rotary device. This makes it possible to assist and promote the rotary motion of the rotary device. In this case, the rotary electric machine 10 acts as the electric motor.

A description will now be given of the effects of the rotary electric machine according to the first exemplary embodiment having the structure previously described.

(1) The stator 12 is comprised of the stator core 12a and the windings 161 and 162 of plural phase parts. The slots 12b are formed and arranged in the stator core 12a along a circumferential direction of the stator core 12a. Each slot 12b has plural layers. For example, in the structure of the rotary electric machine according to the first exemplary embodiment, the windings 161 and 162 form the three phase windings. The slots 12b are formed and arranged in the stator core 12a along a circumferential direction of the stator core 12a. Each slot 12b has the four layer parts, i.e. the first to fourth layer. The conductors 16 are accommodated in the first to fourth layers in each slot 12b. The first to fourth layers are formed from the inner diameter side to the outer diameter side of each slot 12b in the stator core 12a.

The windings 161 and 162 of one phase (for example, one of the U, V and W phases) are comprised of the conductors 16 which are accommodated in the first slots (as the slots A, a and a which are one of a pair of the adjacent slots 12b which are adjacently arranged in the stator core 12a) and the conductors 16 which are accommodated in the second slots (as the slots B, b and 13 which are one of a pair of the adjacent slots 12b which are adjacently arranged in the stator core 12a). Further, the windings 161 and 162 are wound around the stator 12 by connecting the conductors in the (2n−1)-th layer and the 2n-th layer accommodated in the first slots and the second slots.

In this structure, as shown in FIG. 1, FIG. 3, FIG. 7, FIG. 12 to FIG. 17, the conductors 16 accommodated in the n-th layer and the conductors 16 accommodated in the (n+1)-th layer are connected by connecting the conductors 16 together accommodated in the first slots (i.e. connecting the connection conductors A1a2 and A3a4 together shown in FIG. 12) and by connecting the conductors 16 together accommodated in the second slots (i.e. connecting the connection conductors B1b2 and B3b4 together shown in FIG. 12), and by connecting the conductors 16 together accommodated in the first and second slots (i.e. connecting the connection conductors a1B2 and b2A3 together shown in FIG. 12).

Because this structure makes it possible to eliminate an electrical phase difference by the windings arranged in parallel in the first and second slots in a distributed winding structure, that is, by the closed circuit composed of the series circuit sections C11 and C12 which are connected in parallel, as shown in FIG. 12), it is possible to avoid generation of a circulating current and loss caused by the circulating current.

(2) The rotary electric machine according to the first exemplary embodiment has the structure in which the windings 161 and 162 are electrically connected in parallel and the number of the conductors 16 accommodated in the first slots is equal to the number of the conductors 16 accommodated in the second slots, as shown in FIG. 14.

This structure makes it possible to surely cancel and eliminate an electrical phase difference because the number of the conductors 16 is the same in the first slots and the second slots. It is therefore possible to reliably avoid any generation of a circulating current in the closed circuits and loss caused by the circulating current.

(3) The rotary electric machine according to the first exemplary embodiment has the structure in which the crank section 14c is formed at the central section of the stair shaped section 14s in the conductor 16 shown in FIG. 4. The crank section 14c is bent into a crank shape in order to shift the conductor 16 toward a radial direction of the stator 12. The crank section 14c has a maximum height measured from the end surface of the stator core 12a. This structure makes it possible to cross the turn sections 14 of a stair shape to each other, and the windings 161 and 162 are arrange around the stator 12 by using the n-th layer and the (n+1)-th layer in the slots.

(4) The rotary electric machine according to the first exemplary embodiment has the structure in which the windings 161 and 162 are electrically connected together in one of a star connection, a delta connection and a star-delta connection, as shown in FIG. 12 to FIG. 17. This structure makes it possible to generate an electric potential difference in the series circuit sections C11 and C12, and to avoid generation of a circulating current, and to suppress an electric potential difference between the series circuit sections C11 and C12.

(5) In the structure of the rotary electric machine according to the first exemplary embodiment, the bonding section 1A is formed within an angle θ (which is within a range of 0°<θ<360°) in the stator 12, as shown in FIG. 18. This structure makes it possible to easily connect the windings 161 and 162 because the bonding section 1A is formed at the concentrated area designated by the reference character θ in the stator 12 shown in FIG. 18.

(6) The stator 12 of the rotary electric machine according to the first exemplary embodiment has the thirty-two connection sections Un, Vn and Wn of the windings 161 and 162, as shown in FIG. 19. This structure makes it possible to easily switch the connection state selected from the star connection, the delta connection and the star-delta connection.

(7) The rotary electric machine according to the first exemplary embodiment has the rearranging section 1B with which one of the star connection, the delta connection and the star-delta connection is selected as shown in FIG. 19. This structure makes it possible to select one of the star connection, the delta connection and the star-delta connection on the basis of the rearranging signal SW when the rearranging section 1B receives the rearranging signal SW transmitted from the power conversion device 30. It is therefore possible to select the optimum winding connection according to various applications, for example when a vehicle speed is low and the vehicle needs a large torque, or when a vehicle speed is high and the vehicle does not need a large torque, and it is sufficient to have a low torque.

(8) The conductor 16 has the crank section 14c which is bent into a crank shape in order to shift the conductor 16 toward a radial direction of the stator 12, as shown in FIG. 4. This structure makes it possible to easily shift a plurality of the conductors 16 toward the radial direction of the stator 12.

(9) The conductor 16 is composed of the metal member 16m and the insulation film 16r as shown in FIG. 5. The metal member 16m is covered with the insulation film 16r. Because it is not necessary that each of the conductors 16 is covered with an insulation member, the conductors 16 are easily accommodated in the slots 12b.

(10) The rotary electric machine 10 according to the first exemplary embodiment is comprised of the stator 12, the rotor 13 which is rotatably arranged to face the stator 12, as shown in FIG. 1. This structure makes it possible to suppress generation of a circulating current even if the windings 161 and 162 are connected in plural parallel connection.

Second Exemplary Embodiment

A description will be given of the rotary electric machine according to a second exemplary embodiment with reference to FIG. 20, FIG. 21 and FIG. 22. The rotary electric machine according to the second exemplary embodiment has basically the same structure of that of the first exemplary embodiment. The connection structure of the windings and the connection conductors is different between the second exemplary embodiment and the first exemplary embodiment.

In the following explanation, the same components between the second exemplary embodiment and the first exemplary embodiment will be referred with the same reference numbers and characters.

In the rotary electric machine according to the second exemplary embodiment, the number of the windings which form each of the series circuit sections C21 and C22 is different from the number of the windings which form each of the series circuit sections in the first exemplary embodiment.

Figure 20:
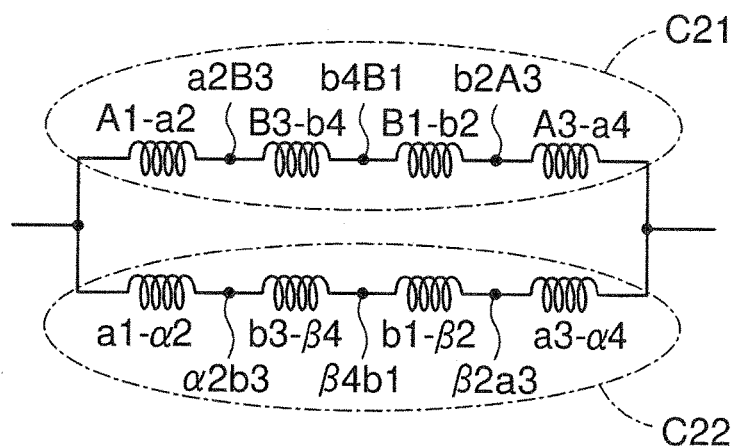
FIG. 20 is a view showing a schematic circuit structure of a second connection example of the conductors in which the conductors are divided into two parallel connections arranged in parallel in the rotary electric machine according to a second exemplary embodiment of the present invention.

FIG. 20 is a view showing a schematic circuit structure of a second connection example of the conductors in which the conductors are divided into two parallel connections arranged in parallel in the rotary electric machine according to the second exemplary embodiment. The connection example shown in FIG. 20 is different from that shown in FIG. 12.

Figure 21:
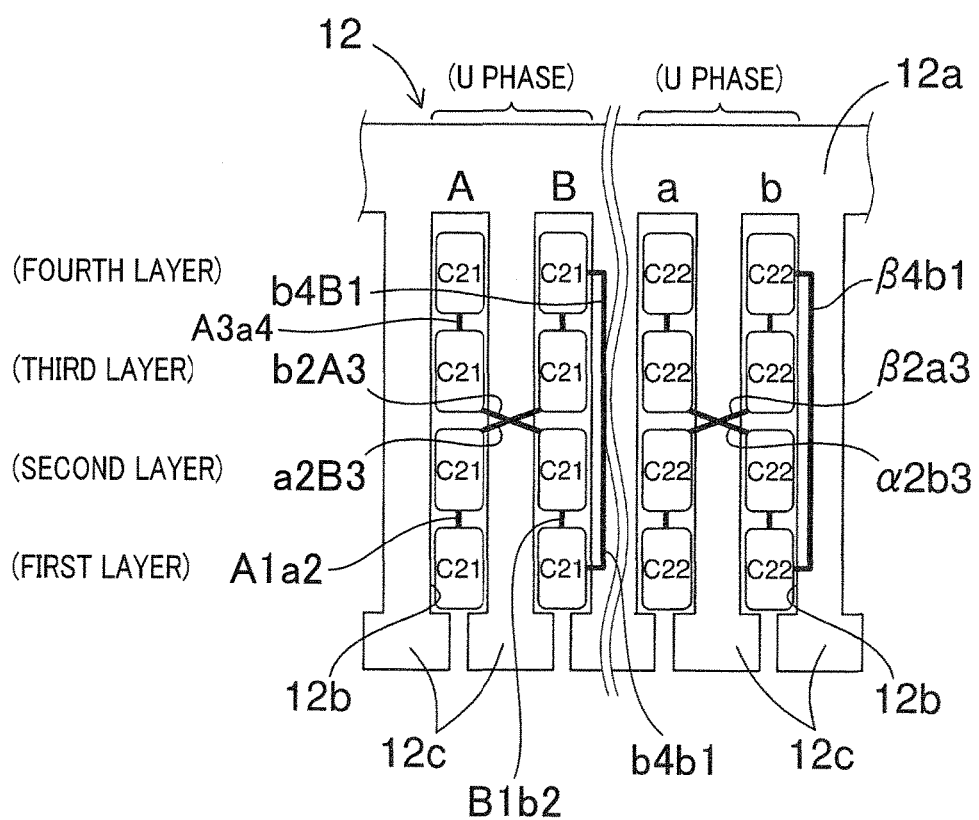
FIG. 21 is a plan view which schematically shows a relationship between a series circuit section and the conductors accommodated in the slots of the stator of the rotary electric machine according to the second exemplary embodiment of the present invention.

FIG. 21 is a plan view which schematically shows a relationship between the series circuit section and the conductors accommodated in the slots of the stator of the rotary electric machine according to the second exemplary embodiment. The connection example shown in FIG. 21 is different from that shown in FIG. 14. FIG. 22 is a schematic view showing a fourth wire connection structure (as a star (Y) connection) of the phase windings of the stator of the rotary electric machine according to the second exemplary embodiment. The connection example shown in FIG. 22 is different from that shown in FIG. 15.

The series circuit section C21 shown in FIG. 20 is composed of the duplex windings A1-$a$2, the duplex windings B3-$b$4, the duplex windings B1-$b$2 and the duplex windings A3-$a$4 which are connected in series. That is, the duplex windings A1-$a$2, the duplex windings B3-$b$4, the duplex windings B1-$b$2 and the duplex windings A3-$a$4 are connected through the connection conductor a2B3, the connection conductor b4B1, and the connection conductor b2A3. Similarly, the series circuit section C22 is composed of the duplex windings a1-$\alpha$2, the duplex windings b3-$\beta$4, the duplex windings b1-$\beta$2 and the duplex windings a3-$\alpha$4 which are connected in series. The duplex windings a1-$\alpha$2, the duplex windings b3-$\beta$4, the duplex windings b1-$\beta$2 and the duplex windings a3-$\alpha$4 are connected through the connection conductor $\alpha$2b3, the connection conductor $\beta$4b1, and the connection conductor $\beta$2a3.

As shown in FIG. 13, the connection conductor a1$\alpha$2, the connection conductor b1$\beta$2, the connection conductor a2$\beta$3, the connection conductor b2$\alpha$3, the connection conductor b3$\beta$4, and the connection conductor a3$\alpha$4 are shifted by six slots from the connection conductor A1$a$2, the connection conductor B1$b$2, the connection conductor A2$b$3, the connection conductor B2$a$3, the connection conductor A3$a$4, and the connection conductor B3$b$4, respectively.

On the basis of the connection structures shown in FIG. 20 and FIG. 13, it is possible to show the connection structure between the slot A, the slot B, the slot a and the slot b.

The series circuit section designated by the alternate long and short dash line in the upper part of FIG. 20 is made by the series connection shown in FIG. 21, which is composed of the winding A1, the connection conductor A1$a$2, the winding a2, the connection conductor a2B3, the winding B3, the connection conductor B3$b$4, the winding b4, the connection conductor b4$b$1, the winding B1, the connection conductor B1$b$2, the winding b2, the connection conductor b2A3, the winding A3, the connection conductor A3$a$4, and the winding a4.

Similarly to the connection structure of the series circuit section C21, the series circuit section C22 designated by the alternate long and short dash line in the bottom part of FIG. 20 is composed of the windings in the slots a and b, and the connection conductors.

According to the connection examples previously described, the slots a and the slots b in the series circuit sections C21 and C22 accommodate the same number of the conductors, respectively. That is, the connection conductors a2B3 and b2A3 in the series circuit section C21 connect the conductors accommodated in different slots. Similarly, the connection conductors $\alpha$2b3 and $\beta$2a3 in the series circuit section C22 connect the conductors accommodated in different slots.

Similar to the structure of the rotary electric machine according to the first exemplary embodiment, the connection structure of the windings and the conductors according to the second exemplary embodiment makes it possible to surely cancel and eliminate an electrical phase difference between the adjacent slots, it is possible to reliably avoid any generation of a circulating current in the closed circuits and loss caused by the circulating current. Because the connection structure can eliminate such an electrical phase difference, it is possible for the closed circuit shown in FIG. 20 to have a high efficiency.

FIG. 20 and FIG. 21 show an example of one phase winding connection. It is possible to apply the connection example shown in FIG. 20 and FIG. 21 to a three phase star connection example. Similar to the structure of the first exemplary embodiment, the windings and the connection conductors shown in FIG. 20 and FIG. 21 are connected in parallel. FIG. 22 shows an example of a three-phase star connection. Examples of a delta connection and a star-delta connection are omitted from the drawings. It is possible to make a delta connection and a star-delta connection on the basis of the connection example shown in FIG. 22, similar to the connection example shown in FIG. 15, the example of the delta connection shown in FIG. 16 and the example of the star-delta connection shown in FIG. 17.

Because the number of the windings to be used for forming the series circuit sections C21 and C22 is different between the first exemplary embodiment and the second exemplary embodiment, it is therefore possible for the rotary electric machine according to the second exemplary embodiment to have the same action and effects of the rotary electric machine according to the first exemplary embodiment.

Third Exemplary Embodiment

A description will be given of the rotary electric machine according to a third exemplary embodiment with reference to FIG. 23, FIG. 24 and FIG. 25. The rotary electric machine according to the third exemplary embodiment has basically the same structure of that of the first exemplary embodiment. The connection structure of the windings and the connection conductors according to the third exemplary embodiment is different from the connection structure of the first and second exemplary embodiments.

In the following explanation, the same components between the third exemplary embodiment and the first exemplary embodiment will be referred by the same reference numbers and characters.

The connection structure or path of the third exemplary embodiment is different from that of the second exemplary embodiment, and also the first exemplary embodiment.

In the connection structure of the second exemplary embodiment as previously described, the windings in each of the series circuit sections C21 and C22 are connected together by using two slots.

On the other hand, in the connection structure of the third exemplary embodiment, the windings in each of the series circuit sections C31 and C32 are connected together by using four slots.

Figure 23:
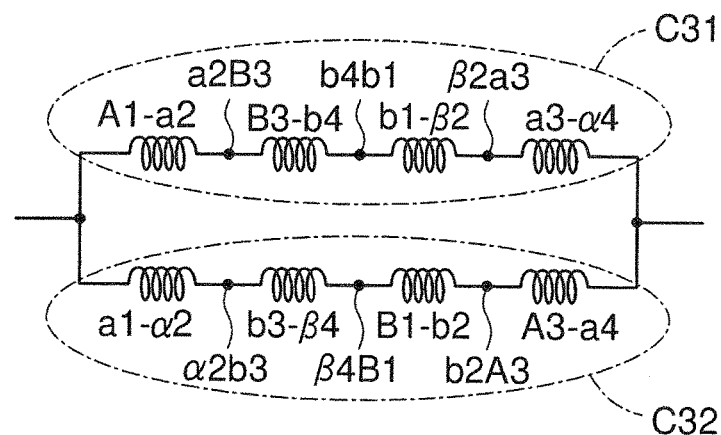
FIG. 23 is a view showing a schematic circuit structure of a third connection example of the conductors in which the conductors are divided into two parallel connections arranged in parallel in the rotary electric machine according to a third exemplary embodiment of the present invention.

FIG. 23 is a view showing a schematic circuit structure of a third connection example of the conductors in which the conductors are divided into two parallel connections arranged in parallel in the rotary electric machine according to the third exemplary embodiment.

Figure 24:
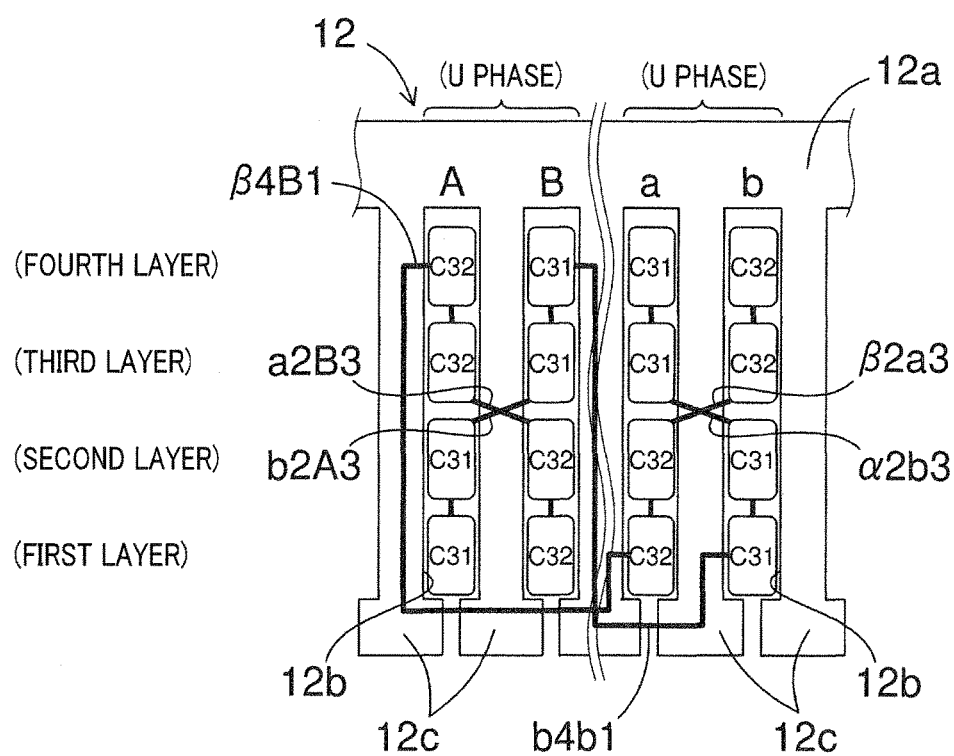
FIG. 24 is a plan view which schematically shows a relationship between a series circuit section and the conductors accommodated in the slots of the stator of the rotary electric machine according to the third exemplary embodiment of the present invention.
Figure 25:
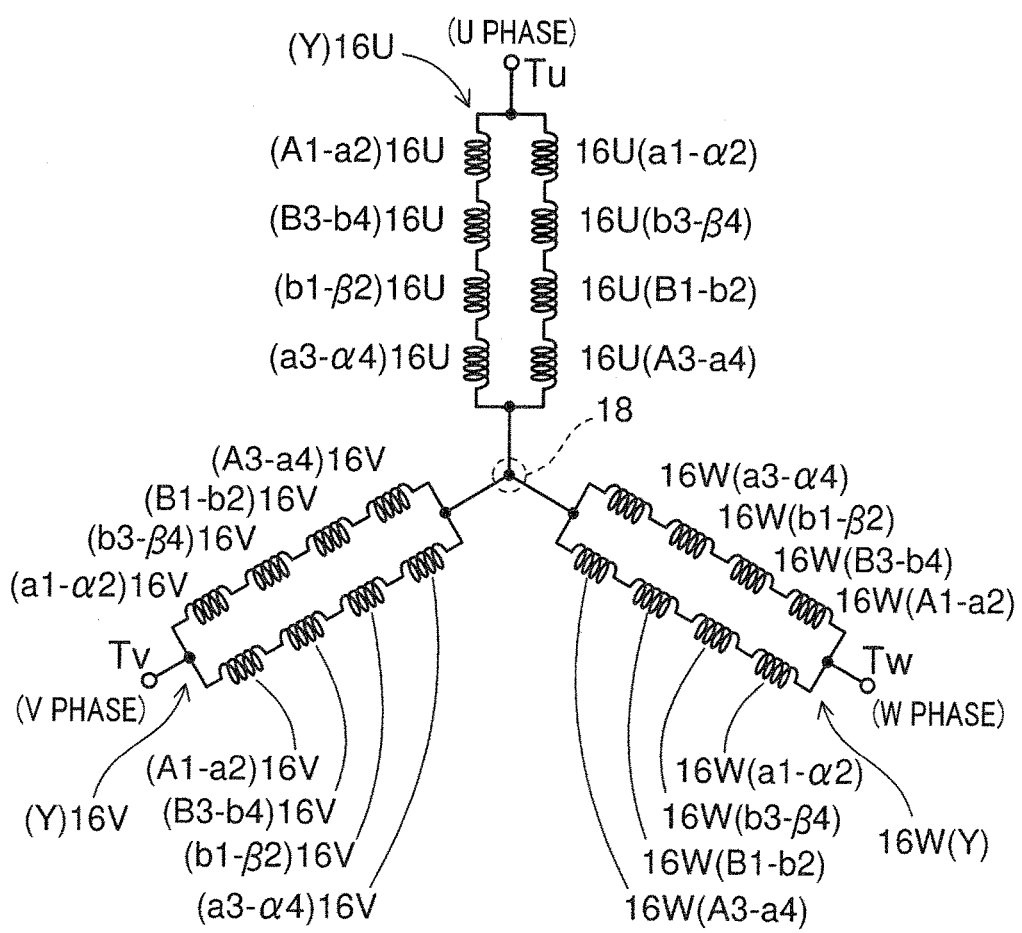
FIG. 25 is a schematic view showing a fifth wire connection structure (a star connection) of the phase windings of the stator of the rotary electric machine according to the third exemplary embodiment of the present invention.

FIG. 24 is a plan view which schematically shows a relationship between a series circuit section and the conductors accommodated in the slots of the stator of the rotary electric machine according to the third exemplary embodiment. FIG. 25 is a schematic view showing a fifth wire connection structure (a star (Y) connection) of the phase windings of the stator of the rotary electric machine according to the third exemplary embodiment.

FIG. 23 shows the connection example which corresponds to the connection example shown in FIG. 12 and the connection example shown in FIG. 20. FIG. 24 shows the connection example which corresponds to the connection example shown in FIG. 14 and the connection example shown in FIG. 21. FIG. 25 shows the connection example which corresponds to the connection example shown in FIG. 15 and the connection example shown in FIG. 22.

The series circuit section C31 shown in FIG. 23 is composed of the duplex windings A1-*a*2, the duplex windings B3-*b*4 and the duplex windings b1-β2, and the duplex windings a3-α4 which are connected in series. The duplex windings A1-*a*2 is connected to the duplex windings B3-*b*4 through the connection conductor a2B3. The duplex windings B3-*b*4 is connected to the duplex windings b1-β2 through the connection conductor b4*b*1. The duplex windings b1-β2 is connected to the duplex windings a3-α4 through the connection conductor β2A3.

Similarly, the series circuit section C32 shown in FIG. 23 is composed of the duplex windings a1-α2, the duplex windings b3-β4 and the duplex windings B1-*b*2, and the duplex windings A3-*a*4 which are connected in series. The duplex windings a1-α2 are connected to the duplex windings b3-β4 through the connection conductor α2*b*3. The duplex windings b3-β4 are connected to the duplex windings B1-*b*2 through the connection conductor β4*b*1. The duplex windings B1-*b*2 are connected to the duplex windings A3-*a*4 through the connection conductor b2A3.

Figure 22:
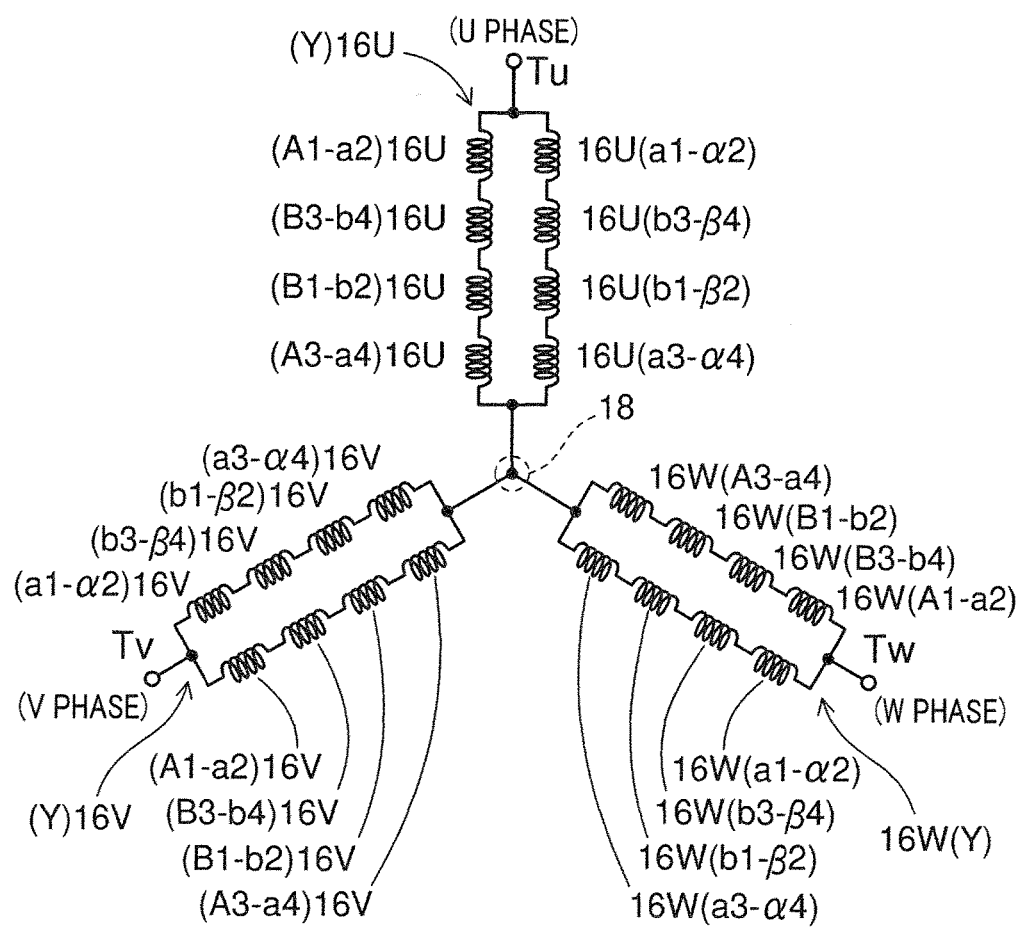
FIG. 22 is a schematic view showing a fourth wire connection structure (a star connection) of the phase windings of the stator of the rotary electric machine according to the second exemplary embodiment of the present invention.

On the basis of the connection structures shown in FIG. 22 and FIG. 13, it is possible to show the connection structure between the slot A, the slot B, the slot a and the slot b shown in FIG. 24.

The series circuit section C31 designated by the alternate long and short dash line in the upper part of FIG. 23 is made by the series connection shown in FIG. 24, which is composed of the winding A1, the connection conductor A1*a*2, the winding a2, the connection conductor A2*b*3, the winding B3, the connection conductor B3*b*4, the winding b4, the connection conductor b4*b*1, the winding b1, the connection conductor b1β2, the winding β2, the connection conductor β2*a*3, the winding a3, the connection conductor a3*a*4, and the winding a4.

Similarly to the connection structure of the series circuit section C31, the series circuit section C32 designated by the alternate long and short dash line in the bottom part of FIG. 23 is made by the series connection shown in FIG. 24, which is composed of the winding a1, the connection conductor a1α2, the winding α2, the connection conductor α2*b*3, the winding b3, the connection conductor b3β4, the winding β4, the connection conductor β4B1, the winding B1, the connection conductor B1*b*2, the winding b2, the connection conductor b2A3, the winding A3, the connection conductor A3*a*4, and the winding a4.

According to the connection examples previously described, the slots A, the slots a, the slots B and the slots b in the series circuit sections C31 and C32 accommodate the same number of the conductors, respectively. That is, the connection conductors a2B3 and β2*a*3 in the series circuit section C31 connect the conductors accommodated in different slots. Similarly, the connection conductors α2*b*3 and b2A3 in the series circuit section C32 connect the conductors accommodated in different slots.

Similar to the structure of the rotary electric machine according to the first exemplary embodiment, the connection structure of the windings and the conductors according to the third exemplary embodiment makes it possible to reliably cancel and eliminate an electrical phase difference between the adjacent slots, it is possible to reliably avoid any generation of a circulating current in the closed circuits and loss caused by the circulating current. Because the connection structure can eliminate such an electrical phase difference, it is possible for the closed circuit shown in FIG. 23 to have a high efficiency.

FIG. 23 and FIG. 24 show an example of one phase winding connection, as previously described. It is possible to apply the connection example shown in FIG. 23 and FIG. 24 to a three phase star connection example. Similar to the structure of the first exemplary embodiment, the windings and the connection conductors shown in FIG. 23 and FIG. 24 are connected in parallel. FIG. 25 shows an example of a three-phase star connection. Examples of a delta connection and a star-delta connection are omitted from the drawings. It is possible to make a delta connection and a star-delta connection on the basis of the connection example shown in FIG. 25, similar to the connection example shown in FIG. 15, the example of the delta connection shown in FIG. 16 and the example of the star-delta connection shown in FIG. 17.

Because the third exemplary embodiment is different in connection path of the windings from the first and second exemplary embodiments, it is possible for the rotary electric machine according to the third exemplary embodiment to have the same action and effects of the rotary electric machine according to the first and second exemplary embodiments.

Fourth Exemplary Embodiment

A description will be given of the rotary electric machine according to a fourth exemplary embodiment with reference to FIG. 26, FIG. 27 and FIG. 28.

The rotary electric machine according to the fourth exemplary embodiment has basically the same structure of that of the first exemplary embodiment. The connection structure of the windings and the connection conductors according to the fourth exemplary embodiment is different from the connection structure of the first, second and third exemplary embodiments.

In the following explanation, the same components between the fourth exemplary embodiment and the first exemplary embodiment will be referred by the same reference numbers and characters.

The fourth exemplary embodiment is different in the number of parallel connections from the first exemplary embodiment.

The first exemplary embodiment has disclosed the two parallel connections. On the other hand, the fourth exemplary embodiment shows the four parallel connections.

Figure 26:
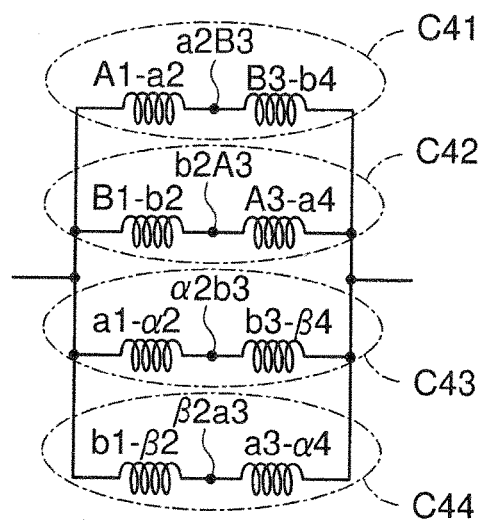
FIG. 26 is a view showing a schematic circuit structure of a connection example of the conductors in which the conductors are divided into four parallel connections arranged in parallel in the rotary electric machine according to a fourth exemplary embodiment of the present invention.

FIG. 26 is a view showing a schematic circuit structure of the connection example of the conductors in which the conductors are divided into four parallel connections arranged in parallel in the stator of the rotary electric machine according to a fourth exemplary embodiment. FIG. 27 is a plan view which schematically shows a relationship between a series circuit section and the conductors accommodated in the slots of the stator of the rotary electric machine according to the fourth exemplary embodiment. FIG. 28 is a schematic view showing a sixth wire connection structure (a star (Y) connection) of the phase windings of the stator of the rotary electric machine according to the fourth exemplary embodiment.

For example, FIG. 26 shows the four parallel connection example which corresponds to the two parallel connection example shown in FIG. 12. FIG. 27 shows the connection example which corresponds to the connection example shown in FIG. 14. FIG. 28 shows a four parallel star connection example which corresponds to the two parallel star connection example shown in FIG. 15.

The series circuit section C41 shown in FIG. 26 is composed of the duplex windings A1-$a$2 and the duplex windings B3-$b$4 which are connected in series. The duplex windings A1-$a$2 are connected to the duplex windings B3-$b$4 through the connection conductor $a$2B3. The series circuit section C42 shown in FIG. 26 is composed of the duplex windings B1-$b$2 and the duplex windings A3-$a$4. The duplex windings B1-$b$2 are connected to the duplex windings A3-$a$4 through the connection conductor $b$2A3. The series circuit section C43 shown in FIG. 26 is composed of the duplex windings a1-$\alpha$2 and the duplex windings b3-$\beta$4. The duplex windings a1-$\alpha$2 are connected to the duplex windings b3-$\beta$4 through the connection conductor $\alpha$2b3. The series circuit section C44 shown in FIG. 26 is composed of the duplex windings b1-$\beta$2 and the duplex windings a2-$\alpha$4 which are connected in series. The duplex windings b1-$\beta$2 are connected to the duplex windings a2-$\alpha$4 through the connection conductor $\beta$2a3.

Figure 27:
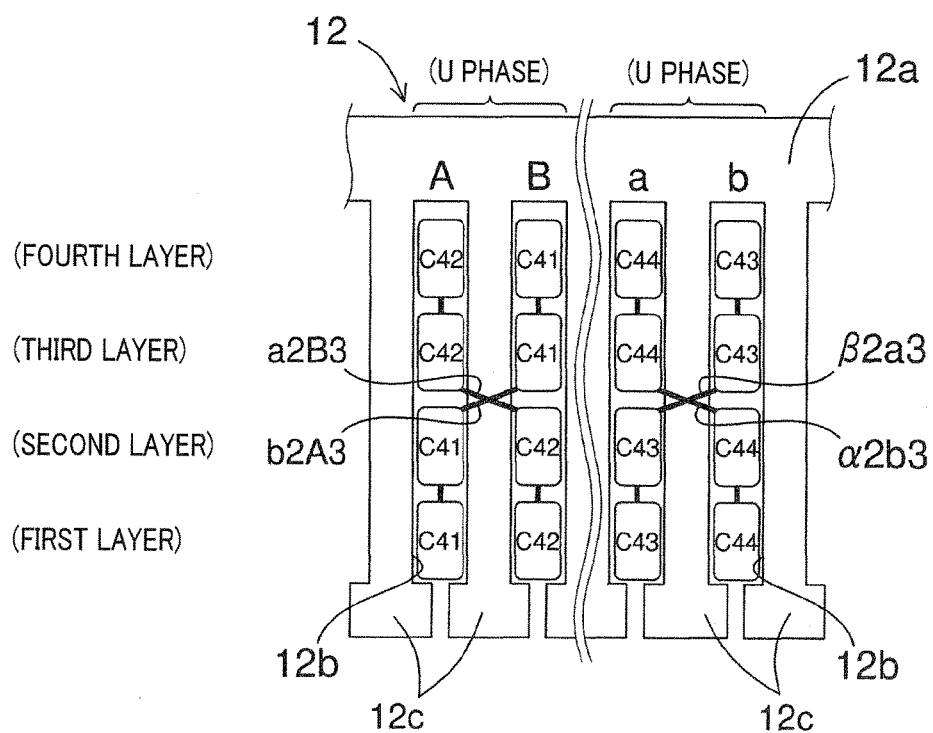
FIG. 27 is a plan view which schematically shows a relationship between a series circuit section and the conductors accommodated in the slots of the stator of the rotary electric machine according to the fourth exemplary embodiment of the present invention.
Figure 28:
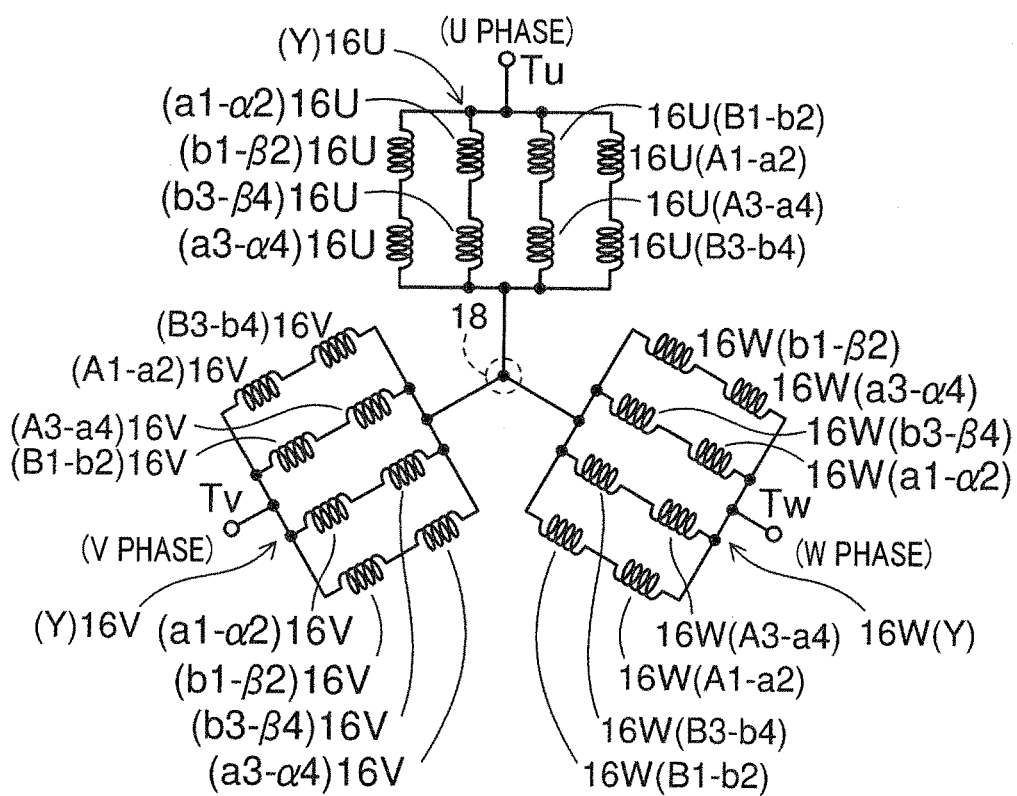
FIG. 28 is a schematic view showing a sixth wire connection structure (a star connection) of the phase windings of the stator of the rotary electric machine according to the fourth exemplary embodiment of the present invention.

On the basis of the connection structures shown in FIG. 26 and FIG. 13, it is possible to show the connection structure between the slot A, the slot B, the slot a and the slot b shown in FIG. 27.

The series circuit sections C41 and C42 shown in FIG. 26 have the same connection structure of the series circuit sections C11 and C12 shown in FIG. 14.

The series circuit section C43 designated by the alternate long and short dash line shown in FIG. 26 is made by the series connection shown in FIG. 27, which is composed of the winding a1, the connection conductor a1$\alpha$2, the winding $\alpha$2, the connection conductor $\alpha$2b3, the winding b3, the connection conductor b3$\beta$4, and the winding $\beta$4.

On the other hand, the series circuit section C44 designated by the alternate long and short dash line shown in FIG. 26 is made by the series connection shown in FIG. 27, which is composed of the winding b1, the connection conductor b1$\beta$2, the winding $\beta$2, the connection conductor $\beta$2a3, the winding a3, the connection conductor a3$\alpha$4, and the winding $\alpha$4.

FIG. 26 and FIG. 27 show an example of one phase winding connection, as previously described. It is possible to apply the connection example shown in FIG. 26 and FIG. 27 to a three phase star connection example. Similar to the structure of the first, second and third exemplary embodiments, the windings and the connection conductors shown in FIG. 26 and FIG. 27 are connected in parallel. FIG. 28 shows an example of a three-phase star connection. Examples of a delta connection and a star-delta connection are omitted from the drawings. It is possible to make a delta connection and a star-delta connection on the basis of the connection example shown in FIG. 28, similar to the connection example shown in FIG. 15, the example of the delta connection shown in FIG. 16 and the example of the star-delta connection shown in FIG. 17.

Because the number of the windings connected in parallel is different between the fourth exemplary embodiment and the first exemplary embodiment, it is possible for the rotary electric machine according to the fourth exemplary embodiment to have the same action and effects of the rotary electric machine according to the first exemplary embodiment.

(Other Modifications)

The concept of the stator and the rotary electric machine according to the present invention is limited by the first to fourth exemplary embodiment previously described. It is possible for the present invention to have the following modifications.

The first to fourth exemplary embodiments have disclosed the structures shown in FIG. 19 in which the two connection nodes Un in each of the U phase winding circuits U1 and U2 are connected to the rearranging section 1B, the two connection nodes Vn in each of the V phase winding circuits V1 and V2 are connected to the rearranging section 1B, and the two connection nodes Wn in each of the W phase winding circuits W1 and W2 are connected to the rearranging section 1B.

Figure 29:
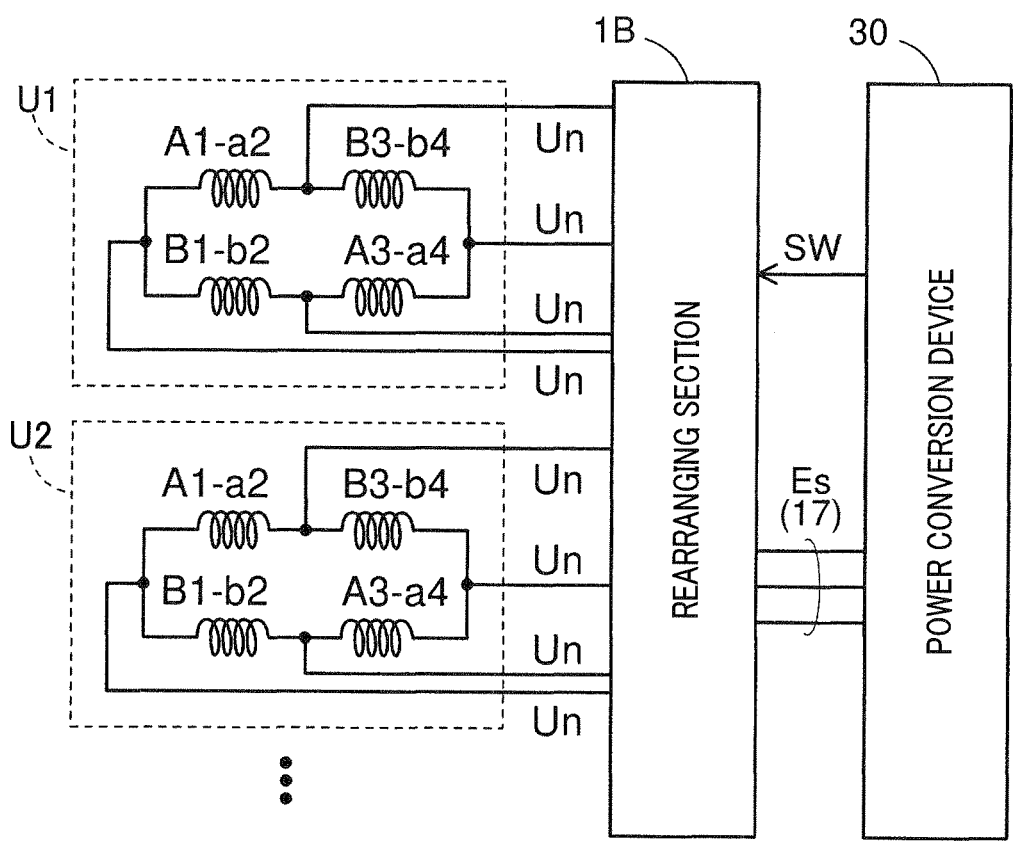
FIG. 29 is a schematic view of a second structure of rearranging the wire connection of the phase windings of the stator by a rearranging section 1B in the rotary electric machine as a modification of the first to fourth exemplary embodiments of the present invention.

FIG. 29 is a schematic view of a second structure of rearranging the wire connection of the phase windings of the stator by the rearranging section 1B in the rotary electric machine as a modification of the first to fourth exemplary embodiments.

As shown in FIG. 29, it is possible to have the connection structure in which the four connection nodes Un in each of the U phase windings U1 and U2, the V phase windings V1 and V2, and the W phase windings W1 and W2 are connected to the rearranging section 1B. That is, in the connection structure shown in FIG. 29, the connection node Un between the duplex windings A1-$a$2 and the duplex windings B3-$b$4, the connection node Un between the duplex windings B1-$b$2 and the duplex windings A3-$a$4, the two connection nodes in the V phase windings (not shown) and the two connection nodes in the W phase windings (not shown) are added to the connection structure shown in FIG. 19. That is, the connection node of the windings between the (2n+1)-th layer and the 2n-th layer are connected to the rearranging section 1B. This structure makes it possible to form the one-way windings arranged along an inside diameter direction in a star connection, and the other-way windings arranged along an outside diameter direction in a delta connection. Because the number of the turns of the windings is easily adjusted, it is possible to easily select the rotation speed and the torque characteristics of the rotary electric machine 10.

In the structure of the first to fourth exemplary embodiments previously described, the star connection and the delta connection having the same number of the windings are combined to make the star-delta connection, for example shown in FIG. 17 and FIG. 30. However, the concept of the present invention is not limited by this. It is possible to form the star-delta connection by using the star connection and the delta connection having a different number of the windings. For example, it is possible to form a star-delta connection comprised of a star connection having the windings arranged in two parallel connections and a delta connection having the windings arranged in four parallel connections. Similarly, it is possible to form the star-delta connection comprised of a star connection having the windings arranged in four parallel connections and a delta connection having the windings arranged in two parallel connections. It is possible to adjust the number of windings arranged in parallel to form another type connection. In particular, it is possible that the rearranging section 1B shown in FIG. 19 selects one of the star-delta connection in which one star connection and the delta connection have the same number of windings arranged in parallel and the other star-delta connection having a different number of the windings arranged in parallel. This makes it possible to easily and precisely adjust the rotation speed and the torque characteristics of the rotary electric machine 10.

The first to fourth exemplary embodiments have disclosed the rotary electric machine in which the stator 12 has the double slot structure composed of the twelve slots 12b and the multiplier number S of the slots 12b is two (S=2). However, the concept of the present invention is not limited by this structure. It is possible for the stator 12 to have a multiple number S of not less than 3 (S≥3).

In the connection structure shown in FIG. 13, a pair of the two slots 12b is assigned to each of the U phase windings, the V phase windings and the W phase windings. It is also possible to assign each of the U phase windings, the V phase windings and the W phase windings to the slots with another multiplier number S. In these modifications, because the multiplier number S is changed only, it is possible for these modifications to have the same action and effects of the first to fourth exemplary embodiments.

The first to fourth exemplary embodiments have disclosed the rotary electric machine in which the winding 161 is composed of the conductors 16 connected in series from the first layer and the second layer, the winding 162 is composed of the conductors 16 connected in series from the third layer and the fourth layer, as shown in FIG. 7. Instead of this connection structure, when not less than five conductors 16 are arranged in each slot 12b, it is possible to connect the conductors 16 in series in the (2n−1)-th layer to the 2n-th layer in the slot 12b, where n is not less than three. That is, the conductors 16 are connected in series from the fifth layer and the sixth layer in the corresponding slots, and the conductors 16 are connected in series from the seventh layer and the eighth layer in the corresponding slots, for example.

Because the layer number is changed only in these cases, and the conductors 16 are connected in series, it is possible for these modifications to have the same action and effects of the first to fourth exemplary embodiments.

The first to fourth exemplary embodiments have disclosed the rotary electric machine in which the terminal T (T1, T2, T3 and T4) is connected to the end section 16t of each of the windings 161 and 162 every two layers, as shown in FIG. 13.

Instead of this connection structure, when not less than four conductors 16 are arranged in a radial direction in each slot 12b, it is possible to connect the terminal T to the end section 16t of the windings 161 and 162 every 2m layer, where m is not less than two. That is, it is acceptable to connect the terminal T to the end section 16t of the winding 161 and 162 every four layer or six layers. Because the number of the terminals T is changed only in these cases, it is possible for these modifications to have the same action and effects of the first to fourth exemplary embodiments.

The first to fourth exemplary embodiments have disclosed the rotary electric machine in which the stator 12 is comprised of the three phase windings 161 and 162, i.e., the U phase windings 16U, the V phase windings 16V and the W phase windings 16W, as shown in FIG. 8 to FIG. 16. However, the concept of the present invention is not limited by this structure. It is possible to form the stator 12 by using phase windings other than three phase windings. For example, it is possible to form the stator by using six phase windings composed of X phase windings, Y phase windings and Z phase windings in addition to the U phase windings, the V phase windings, and the W phase windings. The winding connection using the V phase windings 16V and the W phase windings 16W will be referred to as the "UVW winding connection". The winding connection using the X phase windings, the Y phase windings and the Z phase windings will be referred to as the "XYZ winding connection. It is possible to connect the UVW winding connection and the XYZ winding connection on the basis of one of the connections shown in FIG. 14, FIG. 15 and FIG. 16.

It is necessary to excite every winding connection by the corresponding power conversion device 30 when the UVW winding connection is not connected to the XYZ winding connection in the stator 12. On the other hand, when the UVW winding connection is electrically connected to the XYZ winding connection in the stator 12, the power conversion device 30 can excite them simultaneously. The above case shows the six phase winding connection. It is possible that the stator is composed of another phase winding connection by the manner previously described. Because the phase number is changed only in these cases, it is possible for these modifications to have the same action and effects of the first to fourth exemplary embodiments.

In the structure of each of the first to fourth exemplary embodiments as previously described, each slot 12b is composed of the first layer, the second layer, the third layer and the fourth layer which are arranged in order from the inner diameter side to the outer diameter side, as shown in FIG. 3 and FIG. 12. Instead of this structure, it is possible that each slot 12b is composed of the first layer, the second layer, the third layer and the fourth layer which are arranged in order from the outer diameter side to the inner diameter side. Because these layer structures have the same feature to increase the layer number from one side to the other side in each slot 12b, it is possible for these modifications to have the same action and effects of the first to fourth exemplary embodiments.

In the structure of each of the first to fourth exemplary embodiments, as previously described, the concept of the present invention is applied to the rotary electric machine 10 of an inner rotor type in which the rotor 13 is arranged at the inner diameter side and the stator 12 is arranged at the outer diameter side of the rotary electric machine, as shown in FIG. 1. However, the concept of the present invention is not limited by this. For example, it is possible to apply the concept of the present invention to an electric motor of an inner rotor type, and an alternator of an inner rotor type.

Further, it is possible to apply the concept of the present invention to a rotary electric machine of an outer rotor type in which the rotor 13 is arranged at the outer diameter side and the stator 12 is arranged at the inner diameter side. That is, it is possible to apply the concept of the present invention to a motor-generator of an outer rotor type, an electric motor of an outer rotor type, an alternator of an outer rotor type. Because these devices are different in the structure of the rotor, it is possible for these modifications to have the same action and effects of the first to fourth exemplary embodiments.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A stator comprising a stator core and a plurality of phase windings, wherein
the stator core comprises a plurality of slots formed and arranged in the stator core in a circumferential direction of the stator core,
each of the phase windings comprises conductors, the conductors are electrically connected together to form the phase windings, and the conductors are accommodated in the corresponding slots so that the conductors are stacked in a plurality of layers in each of the slots from one side to the other side in a radial direction of the stator core,
each of the phase windings comprised of the conductors is accommodated in a first slot and a second slot which are arranged adjacently to each other and is arranged around the stator core,
the conductor belonging to the (2n−1)-th layer in the first slot, wherein n is a positive integer, and the conductor belonging to the (2n)-th layer in the first slot in each of the phase windings are electrically connected together in the radial direction of the stator core by using first connection conductors which extend toward the circumferential direction of the stator core,
the conductor belonging to the (2n−1)-th layer in the second slot and the conductor belonging to the (2n)-th layer in the second slot in each of the phase windings are electrically connected together in the radial direction of the stator core by using second connection conductors which extend toward the circumferential direction of the stator core,
the conductor belonging to the (2n)-th layer in the first slot and the conductor belonging to the (2n+1)-th layer in the second slot are electrically connected together in the radial direction of the stator core by using third connection conductors without any intervening slots being electrically connected between the (2n)-th layer in the first slot and the (2n+1)-th layer in the second slot,
a cross section of each of the first connection conductors, the second connection conductors, and the third connection conductors has a rectangular shape,
respective end parts of the first connection conductors, the second connection conductors, and the third connection conductors, in an axial direction of the stator core, are arranged parallel to each other, and the third connection conductor is arranged with a gap extending along the circumferential direction of the stator core so that the gap is between the third connection conductor and the conductor belonging to the (2n)-th layer in the first slot and between the third connection conductor and the conductor belonging to the (2n+1)-th layer in the second slot, and the third connection conductor is not in contact with adjacent conductors arranged in the circumferential direction of the stator core.

2. The stator according to claim 1, wherein when the phase windings are arranged in parallel, the number of the conductors accommodated in the first slot is equal to the number of the conductors accommodated in the second slot.

3. The stator according to claim 1, wherein the conductors have a structure in which each of the conductors has a stair shape and a central section of the each of the conductors has a maximum height measured from an end surface of the stator core.

4. The stator according to claim 1, wherein the phase windings are electrically connected together to form a connection selected from a star connection, a delta connection and a star-delta connection.

5. The stator according to claim 4, wherein the phase windings are bonded at a bonding section which has an angle θ of less than one round of the stator.

6. The stator according to claim 4, further comprising a rearranging section to switch the phase windings to one of the star connection, the delta connection and the star-delta connection.

7. The stator according to claim 1, wherein the conductors forming each of the phase windings are connected by connection sections, and number of the connection sections of the phase windings is thirty two in the stator.

8. The stator according to claim 1, wherein each of the conductors has a crank section having a crank shape.

9. The stator according to claim 1, wherein each of the conductors comprises a metal member having a cross section of a rectangle shape and an insulation film with which the metal member is covered.

10. A rotary electric machine comprising: the stator according to claim 1; and a rotor arranged to face the stator.

11. A stator comprising a stator core and a plurality of phase windings, wherein
the stator core comprises a plurality of slots formed and arranged in the stator core in a circumferential direction of the stator core,
each of the phase windings comprises conductors, the conductors are electrically connected together to form the phase windings, and the conductors are accommodated in the corresponding slots so that the conductors are stacked in a plurality of layers in each of the slots from one side to the other side in a radial direction of the stator core,
each of the phase windings comprised of the conductors is accommodated in a first slot and a second slot which are arranged adjacently to each other and is arranged around the stator core,
the conductor belonging to the (2n−1)-th layer in the first slot, wherein n is a positive integer, and the conductor belonging to the (2n)-th layer in the first slot in each of the phase windings are electrically connected together in the radial direction of the stator core by using first connection conductors which extend toward the circumferential direction of the stator core,
the conductor belonging to the (2n−1)-th layer in the second slot and the conductor belonging to the (2n)-th layer in the second slot in each of the phase windings are electrically connected together in the radial direction of the stator core by using second connection conductors which extend toward the circumferential direction of the stator core, the conductor belonging to the (2n)-th layer in the first slot and the conductor belonging to the (2n+1)-th layer in the second slot are electrically connected together in the radial direction of the stator core by using third connection conductors without any intervening slots being electrically connected between the (2n)-th layer in the first slot and the (2n+1)-th layer in the second slot.

12. The stator according to claim 11, wherein when the phase windings are arranged in parallel, the number of the conductors accommodated in the first slot is equal to the number of the conductors accommodated in the second slot.

13. The stator according to claim 11, wherein the conductors have a structure in which each of the conductors has a stair shape and a central section of the each of the conductors has a maximum height measured from an end surface of the stator core.

14. The stator according to claim 11, wherein the phase windings are electrically connected together to form a connection selected from a star connection, a delta connection and a star-delta connection.

15. The stator according to claim 14, wherein the phase windings are bonded at a bonding section which has an angle $\theta$ of less than one round of the stator.

16. The stator according to claim 14, further comprising a rearranging section to switch the phase windings to one of the star connection, the delta connection and the star-delta connection.

17. The stator according to claim 11, wherein the conductors forming each of the phase windings are connected by connection sections, and number of the connection sections of the phase windings is thirty two in the stator.

18. The stator according to claim 11, wherein each of the conductors has a crank section having a crank shape.

19. The stator according to claim 11, wherein each of the conductors comprises a metal member having a cross section of a rectangle shape and an insulation film with which the metal member is covered.

20. A rotary electric machine comprising: the stator according to claim 11; and a rotor arranged to face the stator.

* * * * *